(12) United States Patent
Koh et al.

(10) Patent No.: US 12,538,011 B2
(45) Date of Patent: Jan. 27, 2026

(54) DIRECTIONAL SWIPING BETWEEN CAMERA VIEWS

(71) Applicant: Rivian IP Holdings, LLC, Plymouth, MI (US)

(72) Inventors: Kok Wei Koh, Mountain View, CA (US); Matthew Royce Miller, San Francisco, CA (US); Hervé Cecchi, Santa Clara, CA (US); Michael Kevin Moore, San Jose, CA (US); Jingying Lin, San Mateo, CA (US)

(73) Assignee: Rivian IP Holdings, LLC, Plymouth, MI (US)

( * ) Notice: Subject to any disclaimer, the term of this patent is extended or adjusted under 35 U.S.C. 154(b) by 415 days.

(21) Appl. No.: 18/091,077

(22) Filed: Dec. 29, 2022

(65) Prior Publication Data
US 2024/0223888 A1 Jul. 4, 2024

(51) Int. Cl.
*H04N 23/63* (2023.01)
*B60R 1/23* (2022.01)
(Continued)

(52) U.S. Cl.
CPC ............. *H04N 23/631* (2023.01); *B60R 1/23* (2022.01); *G06F 3/0488* (2013.01); *H04N 23/62* (2023.01);
(Continued)

(58) Field of Classification Search
CPC ...... H04N 23/631; H04N 23/62; H04N 23/63; H04N 23/90; H04N 7/181; H04N 5/2624; H04N 23/69; H04N 21/41422; H04N 21/47; B60R 1/23; B60R 2300/105; B60R 2300/607; B60R 1/27; B60R 1/28; B60R 2300/303; B60R 2300/304; B60R 2300/70; B60R 11/04; B60R 2300/802; B60R 2300/301; B60R 2300/8093; B60R 1/26; B60R 2300/605; B60R 2300/102; B60R 2300/20; B60R 2300/207; B60R 1/00; B60R 1/22; B60R 2001/1253; B60R 2011/004; B60R 2300/602; B60R 2300/80; B60R 2300/60; B60R 1/24; B60R 1/31; B60R 2001/1215; B60R 2011/0005; G06F 3/0488; G06F 3/04815; G06F 3/0484; B60K 35/00; B60K 35/22; B60K 35/81;
(Continued)

(56) References Cited

U.S. PATENT DOCUMENTS 8,340,870 B2 * 12/2012 Ohshima ................... B60R 1/27
701/42
2011/0074916 A1 * 3/2011 Demirdjian ............ H04N 7/181
348/E13.001
(Continued)

*Primary Examiner* — Abdelaaziz Tissire
(74) *Attorney, Agent, or Firm* — HG Law LLP

(57) ABSTRACT

A vehicle includes multiple cameras that capture images or videos from a variety of perspectives with respect to the vehicle. A user interface within the vehicle provides a visual display of one or more camera views that is selectable and configurable by the user. Swiping on the user interface while a first camera view is displayed modifies the display by accessing and displaying a second camera view. Multiple camera view windows may be displayed side-by-side, with the display of each of the camera view windows capable of modification by user swiping of the user interface.

18 Claims, 16 Drawing Sheets

(51) Int. Cl.
  *G06F 3/0488* (2022.01)
  *H04N 23/62* (2023.01)
(52) U.S. Cl.
  CPC ... *B60R 2300/105* (2013.01); *B60R 2300/607* (2013.01)
(58) Field of Classification Search
  CPC .......... B60K 2360/176; B60K 2360/21; B60K 2360/1438; B60K 2360/186; B60K 2360/143; B60K 2360/1446; B60K 2360/1472; B60K 2360/146
  See application file for complete search history.

(56) References Cited

U.S. PATENT DOCUMENTS

| | | | | |
|---|---|---|---|---|
| 2011/0234802 | A1* | 9/2011 | Yamada | G02B 27/01 348/148 |
| 2012/0287282 | A1* | 11/2012 | Kinoshita | B60R 1/28 348/148 |
| 2013/0177294 | A1* | 7/2013 | Kennberg | H04N 21/816 386/E9.011 |
| 2014/0132527 | A1* | 5/2014 | Wu | H04N 23/631 345/173 |
| 2014/0232851 | A1* | 8/2014 | Hough | H04N 7/181 348/118 |
| 2014/0354798 | A1* | 12/2014 | Galarraga | B60R 1/28 348/113 |
| 2016/0129837 | A1* | 5/2016 | Zhu | B60R 1/28 345/173 |
| 2017/0026574 | A1* | 1/2017 | Kwon | G06F 3/04815 |
| 2020/0282909 | A1* | 9/2020 | Zimmerman | B60R 1/27 |
| 2024/0073510 | A1* | 2/2024 | Ketels | H04N 23/631 |

* cited by examiner

DIRECTIONAL SWIPING BETWEEN CAMERA VIEWS

INTRODUCTION

The present disclosure is directed to a user interface for camera views. More specifically, the present disclosure is directed to providing an interface for navigating through a multiplicity of available camera views.

SUMMARY

Vehicles are provided with a multiplicity of cameras that are used for a variety of purposes such as detecting obstructions and integration with other vehicle safety equipment. Camera feeds provide videos and images from numerous perspectives that a user may have interest in viewing or accessing, or that it may be desirable to bring to a user's attention. In accordance with the present disclosure, a user interface provides capability for a user to access camera feeds and views via intuitive user interface inputs and display elements.

In accordance with some embodiments of the present disclosure, system and methods are provided for displaying a first camera view of available camera view associated with a vehicle. For example, displaying the first camera view comprises displaying the first camera view on a touch screen. In some embodiments, the first camera view is displayed side-by-side with a top view of the vehicle.

In some embodiments, in response to detecting a swipe input, a second camera of the available camera views may be selected and displayed in place of the first camera view. For example, the available camera views comprise front, back, and bed (e.g., of a truck) views associated with the vehicle and detecting the swipe input comprises detecting a vertical swipe input. For example, if the first camera view is displayed on a touch screen, detecting the swipe input may comprise detecting the swipe input on the touch screen over the first camera view being displayed. In some embodiments, selecting the second camera view of the available camera views is based on a direction of the swipe input. For example, the user may swipe down to transition from the first camera view to the second camera view. The user may then swipe up from the second camera view to transition back to the first camera view.

In some embodiments, an indicator may be displayed that indicates the available camera views associated with the vehicle, wherein the indicator represents an ordered list of the available camera views and wherein a direction of the swipe input determines the direction within the ordered list that will be used to select the second camera view. For example, the indicator may comprise a bar, the bar comprising a first portion representing the first camera view while the first camera view is being displayed, and a second portion representing other available camera views not being displayed while the first camera view is being displayed.

In some embodiments, a ratio of a length of the first portion of the bar to a length of the bar corresponds to a ratio of the number one to the number of available camera views.

In some embodiments, in response to detecting a swipe input, a position of the first portion within the bar is moved to a location representing the second camera view being displayed after detection of the swipe input. In some embodiments, in response to detecting a swipe input, a description of the available camera views next to the indicator is displayed.

In some embodiments, in response to detecting a swipe input, in response to detecting a selection of the indicator, the first camera view is replaced with a mosaic view of the available camera views.

In some embodiments, a top view of the vehicle may be displayed side-by-side with the displayed first camera view or second camera view.

In some embodiments, in response to detecting a swipe input associated with the top view of the vehicle, the top view of the vehicle may be replaced with a left side view from the vehicle positioned to the left of the displayed first camera view or second camera view and a right side view from the vehicle positioned to the right of the displayed first camera view or second camera view. In some embodiments, when the displayed first camera or second camera view is a front view, the left side view is a left front side view and the right side view is a right front side view. In some embodiments, when the displayed first camera or second camera view is a rear view, the left side view is a left rear side view and the right side view is a right rear side view.

In some embodiments, systems and methods are provided to select and display a second camera view of available camera views in place of a first camera view of the available camera views in response to detecting a swipe input. For example, a memory may store instructions, and control circuitry may be configured to execute the instructions stored in the memory to display the first camera view, and in response to detecting the swipe input, to select and display the second camera view in place of the first camera view.

In some embodiments, a touch screen may be configured to display the available camera views, wherein the control circuitry is configured to detect the swipe input on the touch screen over the first camera view being displayed.

In some embodiments, the control circuitry may be configured to display an indicator that represents an ordered list of the available camera views, wherein a direction of the swipe input determines the direction within the ordered list that will be used to select the second camera view. In some embodiments, in response to detecting a selection of the indicator, the first camera view may be replaced with a mosaic view of the available camera views.

In some embodiments, the control circuitry may be configured to display a vertical bar indicator that indicates the available camera views associated with the vehicle, wherein the available camera views comprise front, back, and bed views associated with the vehicle and wherein detecting the swipe input comprises detecting a vertical swipe input.

In some embodiments, the control circuitry may be configured to display a top view of the vehicle side-by-side with the displayed first camera view or second camera view. In some embodiments, in response to detecting a swipe input associated with the top view of the vehicle, the top view of the vehicle may be replaced with a left side view from the vehicle positioned to the left of the displayed first camera view or second camera view and a right side view from the vehicle positioned to the right of the displayed first camera view or second camera view. In some embodiments, when the displayed first camera or second camera view is a front view, the left side view is a left front side view and the right side view is a right front side view. In some embodiments, when the displayed first camera or second camera view is a rear view, the left side view is a left rear side view and the right side view is a right rear side view.

In some embodiments, a vehicle is provided with one or more front facing cameras, one or more rear facing cameras, a display, and control circuitry. For example, the control circuitry may be configured to display a first video feed of the one or more front facing cameras or the one or more rear facing cameras on the display, and in response to detecting a swipe input on the display, select a second video feed of the one or more front facing cameras or the one or more rear facing cameras based on the swipe input, and to then display the second video feed in place of the first video feed on the display.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

A vehicle is equipped with multiple cameras that capture images and/or videos from a variety of locations and perspectives with respect to the vehicle. Each of the camera feeds is available for display at a user interface of the vehicle such that the user can navigate through a multiplicity of camera feeds. Other "camera" views may be provided that are at least partially rendered, such as by combining images from multiple camera views or creating an image based on other available data. One or more display windows are displayed, such as a primary window providing an ability to navigate through primary camera views and a secondary window for navigating through secondary camera views. It will be understood that the terms "primary" and "secondary" are merely being used to distinguish between two different views or windows and that other terms such as "first" and "second" can be used in their place.

In an embodiment, example primary camera views may include a front view, a back view, and a view for a bed of the vehicle, while example secondary camera views may include a top view and side views of the vehicle. A user navigates views such as by swiping on a touch screen of the user interface. An indicator provides information to assist the user in navigating the views, for example, by providing a visual indicator of the available number of views and information about the views, such as a name or location of the view on the vehicle. An appropriate swiping of the primary or secondary window causes a transition between available views within the respective window. Other types of swiping or user selections enable other features, such as panning or additional display elements.

Figure 1:
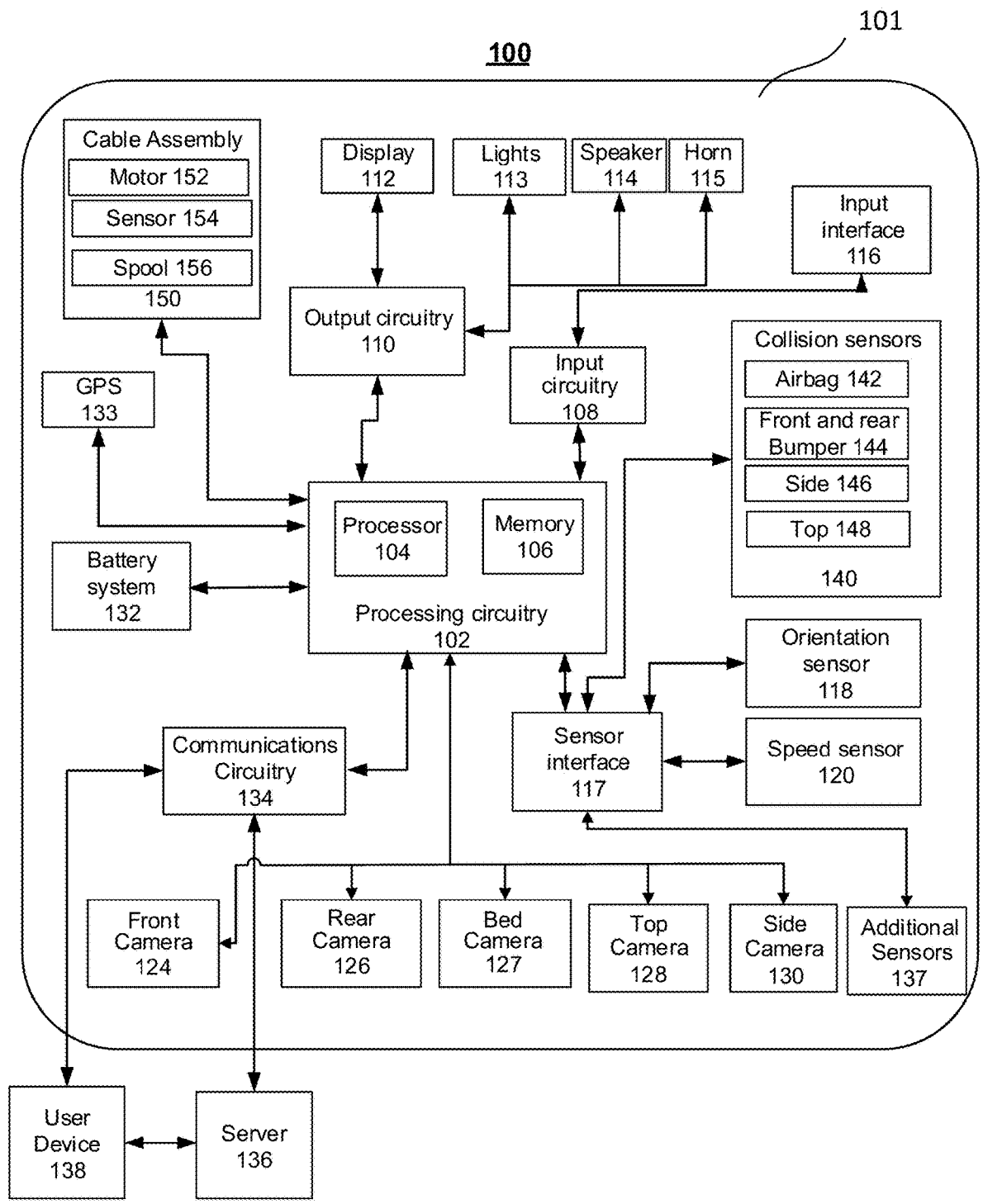
FIG. 1 shows a block diagram of components of a system of a vehicle configured to view and monitor the surrounding area of the vehicle, in accordance with some embodiments of the present disclosure.

FIG. 1 shows a block diagram of components of a system 100 of a vehicle 101 configured to provide a variety of camera views for the vehicle, in accordance with some embodiments of the present disclosure. System 100 may comprise more or fewer than the components depicted in or described in reference to FIG. 1. Additionally, system 100 or any components thereof may be utilized for the components and or operations described and/or depicted herein, for example, with respect to FIGS. 2-14. In some embodiments, vehicle 101 includes multiple cameras located at a variety of locations of the exterior and/or interior vehicle, as wells as additional components (e.g., sensors, etc.) that may be used to generate additional camera-like views, for example, by aggregating information from sensors along with known information such as vehicle location and vehicle model. Vehicle 101 may be a car (e.g., a coupe, a sedan, a truck, an SUV, a sport utility vehicle, a full-size van, a minivan, a delivery van, a bus), a motorcycle, an aircraft (e.g., a drone), a watercraft (e.g., a boat), or any other type of vehicle. Vehicle 101 may include any kind of motor or motors capable of generating power (e.g., gas motors, gas-electric hybrids motors, electric motors, battery-powered electric motors, hydrogen fuel cell motors).

Vehicle 101 may comprise processing circuitry 102 which may include processor 104 and memory 106. Processor 104 may comprise a hardware processor, a software processor (e.g., a processor emulated using a virtual machine), or any combination thereof. In some embodiments, the processing circuitry is part of an on-board computer, that is configured to operate the vehicle. In some embodiments, the on-board computer may be configured to operate the vehicle autonomously or semi-autonomously. The on-board computer may include communications drivers that communicate with a user device 138 and servers 136. In some embodiments, processor 104 and memory 106 in combination may be referred to as processing circuitry 102 of vehicle 101. In some embodiments, processor 104 alone may be referred to as processing circuitry 102 of vehicle 101. Memory 106 may include hardware elements for non-transitory storage of commands or instructions, that, when executed by processor 104, cause processor 104 to operate vehicle 101 in accordance with embodiments described above and below. Processing circuitry 102 may be communicatively connected to components of vehicle 101 via one or more wires, or via wireless connections. For example, captured images or videos may be processed (e.g., to provide filtering and/or editing appropriate for lighting conditions, weather conditions, and particularly driving scenarios) for selective display to a user in the vehicle such as on a display of a user interface (e.g., which may be user interface incorporating elements of display 112 and input interface 116).

Processing circuitry 102 may be communicatively connected to input interface 116 (e.g., a steering wheel, a touch screen display, buttons, knobs, and a microphone or other audio capture device) via input circuitry 108. In some embodiments, at least one of a driver or occupant of vehicle 101 may be permitted to select certain settings in connection with the operation of vehicle 101. In some embodiments, processing circuitry 102 may be communicatively connected to GPS system 133 or other positioning devices of vehicle 101, where the driver may interact with the GPS system via input interface 116. GPS system 133 may be in communication with at least one satellite (or satellites) or server (or servers) 136 remote from vehicle 101 to ascertain the driver's location and provide navigation directions to processing circuitry 102. As another example, the positioning device may operate on terrestrial signals, such as cell phone signals, Wi-Fi signals, or ultra-wideband signals to determine a location of electric vehicle 101. The determined location may be in any suitable form such as a geographic coordinate, a street address, a nearby landmark such as an identification of the nearest charging station or a tagged location associated with the vehicle (e.g., a location of a home of the user stored in memory 106).

Processing circuitry 102 may be communicatively connected to display 112, lights 113, speaker 114 and horn 115 by way of output circuitry 110. Display 112 may be located on or within at least one of a dashboard of vehicle 101 or a heads-up display at a windshield of vehicle 101, and in embodiments, may include multiple displays such as a user interface for providing information and controlling systems of the vehicle 101, as described herein. For example, an interface for GPS system 133 or an interface of an infotainment system may be generated for display at a user interface, and display 112 may comprise an LCD display, an OLED display, an LED display, or any other type of display. Lights 113 may be located at one or more of any location within the cabin of vehicle 101 (e.g., at the dashboard of vehicle 101), on the exterior of the vehicle, on an interior portion of the vehicle door, on exterior flasher lights, on exterior headlights, or on exterior blinker lights. In some embodiments, the lights may be LED lights and may increase luminance based on the detection of a motion event.

Processing circuitry 102 may be communicatively connected to at least one camera (e.g., front camera 124, rear camera 126, bed camera 127, top camera 128, side cameras 130), an orientation sensor 118, a speed sensor 120, and additional sensors 137, including via sensor interface 117. Orientation sensor 118 may be an inclinometer, an accelerometer, a tiltmeter, any other pitch sensor, or any combination thereof and may be configured to provide vehicle orientation values (e.g., the vehicle's pitch or the vehicle's roll) to processing circuitry 102. Speed sensor 120 may be one of a speedometer, a GPS sensor, or the like, or any combination thereof, and may be configured to provide a reading of the vehicle's current speed to processing circuitry 102. Additional sensors 137 may include at least one of a front sensor, a rear sensor, a truck bed sensor, a left side sensor, a right side sensor, or a cable sensor and may be positioned at a variety of locations of vehicle 101, and may comprise one or more of a variety of sensor types (e.g., one or more of an image sensor, an ultrasonic sensor, a radar sensor, LED sensor, LIDAR sensor configured to output a light or radio wave signal, and measuring at least one of a time for a return signal to be detected or an intensity of the returned signal, performing image processing on images captured by the image sensor of the surrounding environment of vehicle 101). In some embodiments, processing circuitry 102 may take into account the acceleration/deceleration of vehicle 101, e.g., based on sensor data generated by orientation sensor 118 which may trigger a motion event exceeding an event detection threshold.

Processing circuitry 102 may further be communicatively connected (e.g., by way of sensor interface 117) to collision sensors 140 (e.g., airbag sensor 142, bumper 144, side 146, top 148). The collision sensors 140 may include an airbag system, e.g., window area sensors, airbag system, and collision sensor. The airbag system includes multiple airbag sensors 142 arranged proximate to one or more window areas or other areas of the vehicle and configured to transmit a signal to processing circuitry in response to the deployment of an airbag. Vehicle collision sensor(s) 140 typically include gyroscopes, accelerometers, or both. For example, vehicle collision sensor(s) 140 may include a MEMS accelerometer capable of detecting the deceleration of a vehicle during an impact and position of the vehicle. Vehicle collision sensor(s) 140 may be arranged at various positions in a vehicle. For example, vehicle collision sensor(s) 140 may be configured to detect impacts, motion and deceleration at the front of vehicle 101, side of vehicle 146, rear of vehicle 144, top of vehicle 148, or a combination thereof (e.g., at the corners of vehicle 101). In some embodiments, vehicle collision sensor(s) 140 includes more than one sensor, each having similar circuitry and capabilities for detecting collision scenarios for vehicle 101. In some embodiments, vehicle collision sensor(s) 140 includes more than one sensor, each having different capabilities that are, for example, designed for the particular location of the vehicle. In some embodiments, the sensors are configured to capture video. In some embodiments, the level of damage may be determined based on the damage occurring at a particular location on the vehicle. For example, the vehicle may be involved in a small bumper-to-bumper accident, and the location sensors for the bumper may indicate the level of damage as low based on a signal from a sensor. In some embodiments, vehicle collision sensor(s) 140 includes a seat sensor configured to detect whether a person is sitting in a particular seat.

Vehicle collision sensor(s) 140 may be in communication with processing circuitry 102. In some embodiments, processing circuitry 102 is configured to analyze data from vehicle collision sensor(s) 140 and send one or more signals to activate one or more airbags 142 of airbag system. Based on information from vehicle collision sensor(s) 140, processing circuitry 102 may determine an impact type (e.g., a side, a front, a rear, a corner or a rollover collision or a flooding event) and vehicle occupancy (e.g., driver, and passengers, if any) and initiate deployment of a suitable airbag of airbag system for the impact type. Based on information from vehicle collision sensor(s) 140, processing circuitry 102 may determine which camera captured at least one of the images or video of at least one of the impact and determine and/or relay information related to the impact as appropriate.

In some embodiments, the processing circuitry 102 determines a collision event by accelerometers sensors configured to monitor changes in speed. For example, if the speed of the vehicle changes, the processing circuitry 102 may perform a vehicle collision sensor check to ensure that all sensors on the exterior of the vehicle are responsive. In response to the sensors not responding, the processing circuitry 102 may determine that a collision occurred and being the process of reporting a status.

In some embodiments, the processing circuitry 102 may further be connected to the at least one camera in order to capture camera views that may be displayed for a user of the vehicle. For example, the front camera 124, rear camera 126, bed camera 127, top camera 128, and side cameras 130 may be communicatively connected as described above. Moreover, it will be understood that cameras from anywhere else on the vehicle (e.g., an inner trunk of the vehicle, a back seat of the vehicle, under the vehicle, etc.), and that said processing circuitry may be further connected to camera views received from external feeds (e.g., via communications circuitry 134), such as other vehicles, infrastructure (e.g., streetlight cameras, etc.), drones, or rendered camera feeds created from multiple cameras and/or from information received from external sensors (e.g., LIDAR, etc.).

Processing circuitry 102 may further be communicatively connected to cable assembly 150 or another means for securing cargo in or to an exterior storage compartment. Cable assembly 150 may include a motor 152, one or more sensors 154, and spool 156. Motor 152 may include, for example, a DC motor (e.g., permanent magnet motor, brushed or brushless motor, wound stator), an AC motor (e.g., an induction motor), any other suitable motor having any suitable number of poles and phases, or any combination thereof. For example, motor 152 may include a permanent magnet DC motor configured to operate at 12 VDC. A clutch may be configured to couple and de-couple motor 152 from spool 156. For example, in some embodiments, the clutch is controlled by processing circuitry 102, which may provide control signals for engaging or disengaging the clutch. In an illustrative example, the clutch may be disengaged to allow free-spooling of the cable assembly. Spool 156 is coupled to motor 152, optionally via a gearset to provide gear reduction, and rotates with a motor shaft of motor 152. The cable is wound on spool 156 and is used to pull or tow cable assembly from an open position to a closed position. Sensor (s) 154 may include voltage sensors, current sensors, temperature sensors, impedance sensors, position sensors (e.g., encoders for determining spool position), torque sensors, any other suitable sensors, or any combination thereof. Cable assembly 150 may be integrated into at least one of the body or the frame of the vehicle storage compartment or may be affixed to the vehicle separately, although the electric power and controls for cable assembly 150 are coupled to the vehicle 101. In some embodiments, cable assembly 150 may include power electronics (e.g., a motor drive), and accordingly may be coupled to battery system 132 and be configured to receive control signals from processing circuitry (e.g., analog signals, PWM signals, digital signals, messages). In some embodiments, one or more cameras may provide images allowing a user to monitor the cable assembly 150 and/or an external item coupled thereto, which in some embodiments may be automatically displayed to the user interface based on the operation of the cable assembly 150.

Processing circuitry 102 may be communicatively connected to battery system 132, which may be configured to provide power to one or more of the components of vehicle 101 during operation. In some embodiments, vehicle 101 may be an electric vehicle or a hybrid electric vehicle. In some embodiments, the processing circuitry 102 may utilize a plurality of battery cells packaged together to create one or more battery modules or assemblies to store energy and release the energy upon request.

It should be appreciated that FIG. 1 only shows some of the components of vehicle 101, and it will be understood that vehicle 101 also includes other elements commonly found in any assembly corresponding to a vehicle, such as a vehicle powered by substantially electronic powertrain (e.g., a motor, brakes, wheels, wheel controls, turn signals, windows, or doors).

Figure 2:
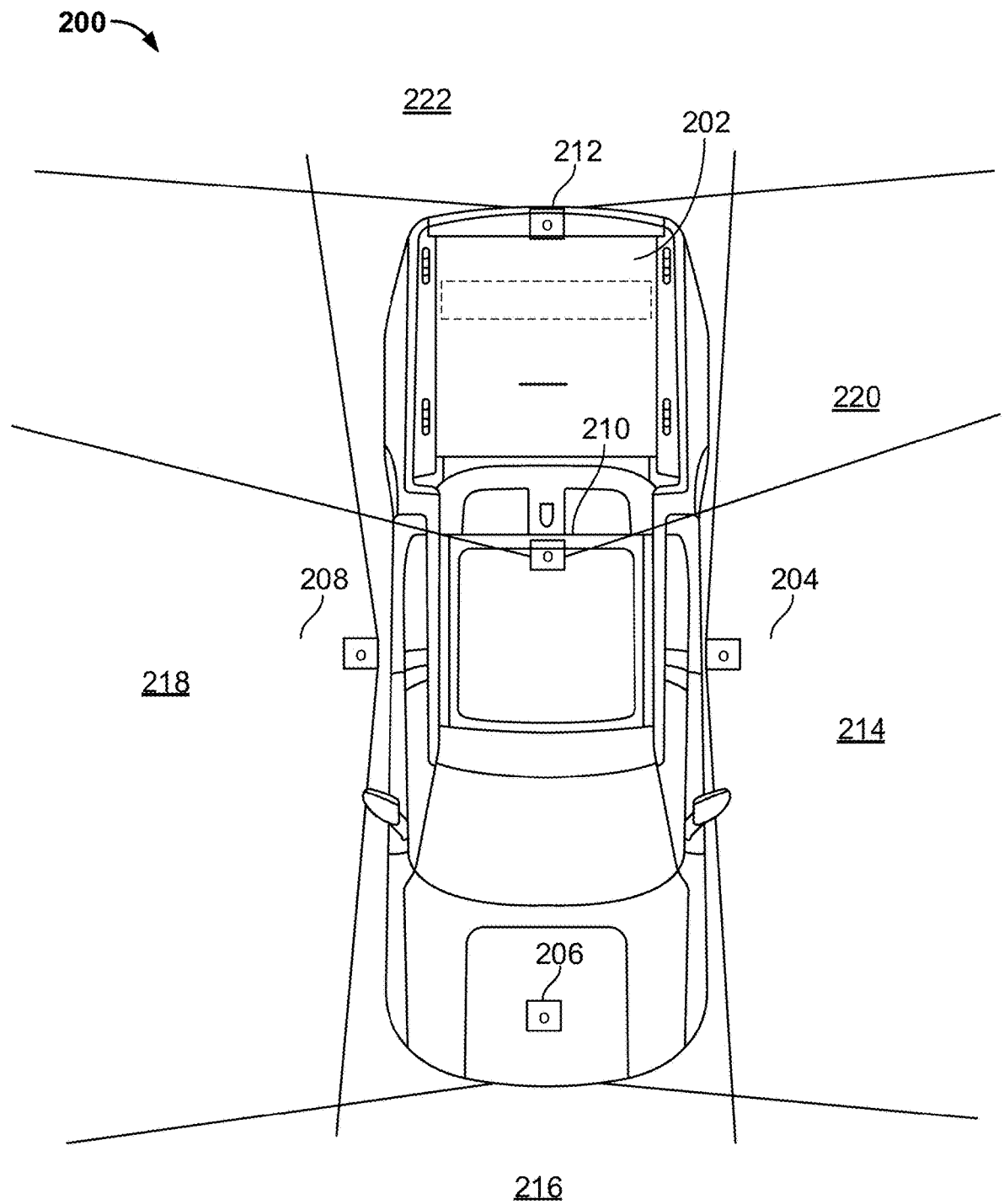
FIG. 2 shows a top view of an illustrative vehicle configured with a plurality of cameras disposed on the vehicle, in accordance with some embodiments of the present disclosure.

FIG. 2 shows a top view 200 of an illustrative vehicle configured with a plurality of cameras disposed on the vehicle, in accordance with some embodiments of the present disclosure. Although a particular type and number of cameras are depicted in particular locations in FIG. 2, it will be understood that any suitable number of cameras may be provided at a variety of suitable locations, angles, focus parameters, as desired to capture particular information. Cameras may capture images and/or video at particular resolutions and in different manners (e.g., continuous feeds and/or series of images at particular capture frequencies), and in some embodiments, may modify parameters or operational modes based on instructions, events, or other measured parameters of the vehicle. Although cameras as described herein may be capturing video and images, in some embodiments, "camera" views may be generated or rendered by combining multiple videos or images, or in some embodiments, based on other known information such as base images associated with a known location and sensor data (e.g., GPS and/or LIDAR data).

Top view 200 includes a depiction of vehicle 202 along with the position of exemplary cameras disposed around the vehicle. Vehicle 202 may include multiple cameras, such as left-side camera 204, front camera 206, right-side camera 208, top camera 210, and rear camera 212, each with a respective image range 214, 216, 218, 220 and 222 associated therewith. One or more of the cameras 204, 206, 208, 210 and 212 may correspond to at least one of the cameras 124, 126, 127, 128, and 130 of FIG. 1. In some embodiments, any suitable number of cameras may be used, and diverse positions of the cameras (e.g., showing a variety of different angles at varying distances from each other in various different environments) may be utilized.

The cameras 204, 206, 208, 210 and 212, and their respective captured images, can be used for a variety of purposes, such as the identification of obstructions that the vehicle should avoid colliding with. Moreover, camera feeds can also be processed and provided to the user using an intuitive display that allows the user to configure and navigate according to personal preferences and settings. For example, one of the cameras from the at least one camera may be displayed on an interface in the vehicle for the user's convenience. The user may input a horizontal swipe to pan the currently displayed camera view. Furthermore, the user may input a vertical swipe on said interface to swap to a different camera view of the available cameras associated with the vehicle. For example, the user may swipe to a rear camera view when driving the vehicle backwards (e.g., into a parking space), or may swipe to a side camera view when changing lanes. It will be understood that respective orientations and swiping directions may be modified based on user interface types, for example, based on user interface aspect ratios.

Figure 3:
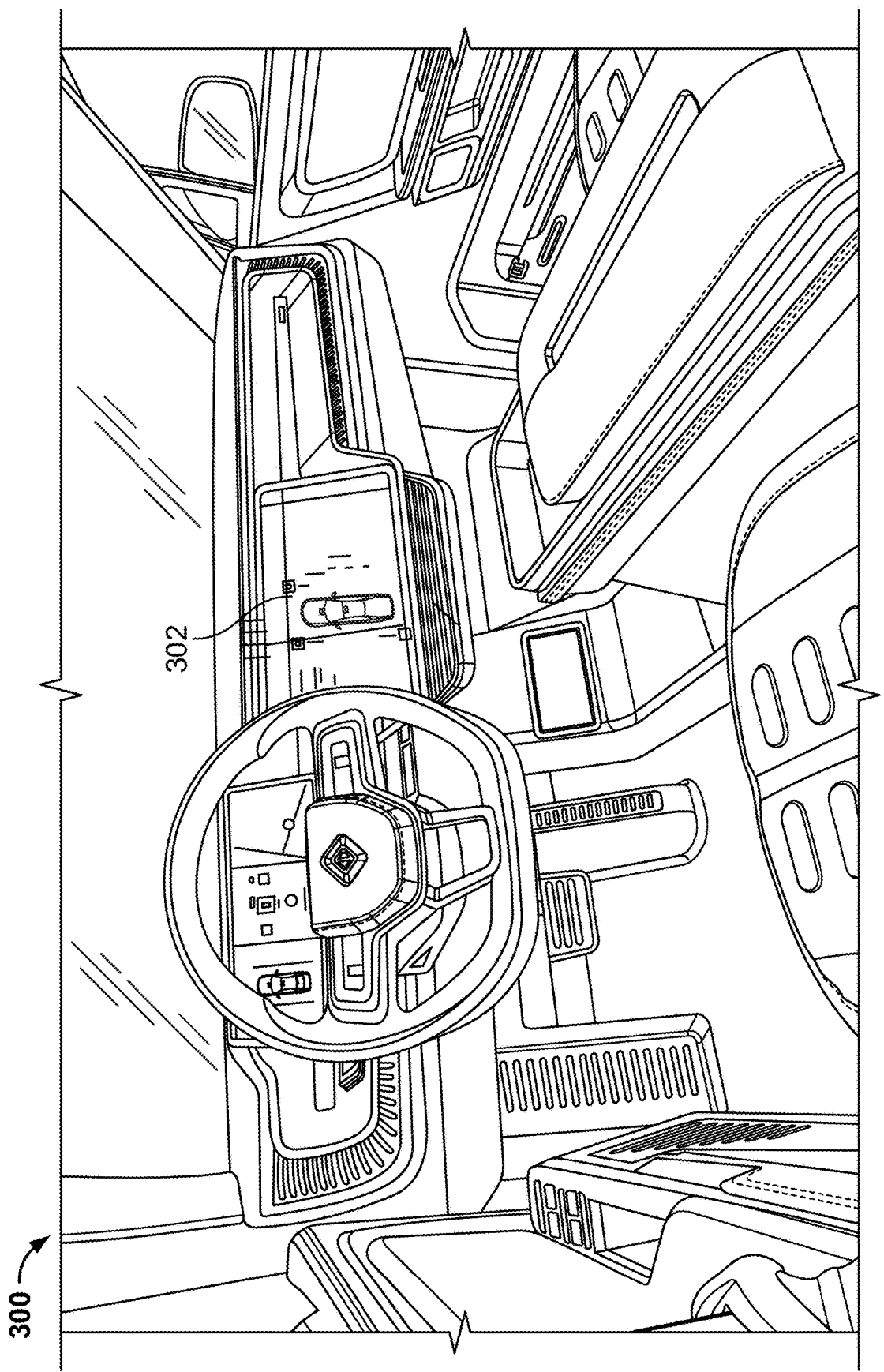
FIG. 3 depicts an illustrative example of a vehicle interior featuring a user interface, in accordance with some embodiments of the present disclosure.

FIG. 3 depicts an illustrative example of a vehicle interior 300 featuring a user interface 302, in accordance with some embodiments of the present disclosure. Vehicle interior 300 may comprise more or fewer than the elements depicted in or described in reference to FIG. 3. In some embodiments, a user interface 302 (e.g., a graphical user interface) may refer to components incorporated into, coupled to, or accessible by a user seated within vehicle interior 300 in FIG. 3. For example, the user interface may be a touch screen orientated towards the driver of the vehicle, or can be a projected display, an augmented reality display. The user interface may also be located in a position that is accessible to other users (e.g., the interface may be located in a position that is accessible by a separate user sitting in a passenger seat, or located in a back seat of the vehicle). The user interface may be adaptable to different vehicle interior configurations. For example, a vehicle with no driver (e.g., an automated self-driving vehicle) may have a user interface configured to follow a particular user moving about vehicle, or follow commands provided by a user (e.g., a command to navigate to a particular location, etc.). In some embodiments, user interface 302 may be provided on a device separate from the vehicle such as user device 138 (e.g., a smartphone or tablet).

Vehicle interior 300 is equipped with a user interface 302 that may be used to monitor, control, and otherwise interact with the systems of the vehicle. For example, a user in vehicle interior 300 utilize the user interface 302 to access vehicle options via dynamic user interfaces provide at the user interface 302. In some embodiments, the user interface 302 may be incorporated into vehicle interior 300 or user equipment used to access such vehicle systems while using the vehicle (e.g., a smart phone or user A/R device). Vehicle systems displayed on the user interface 302 may be communicatively connected with other user inputs (e.g., buttons, microphone, speakers, augmented reality displays, haptic inputs) of vehicle interior 300.

Figure 4:
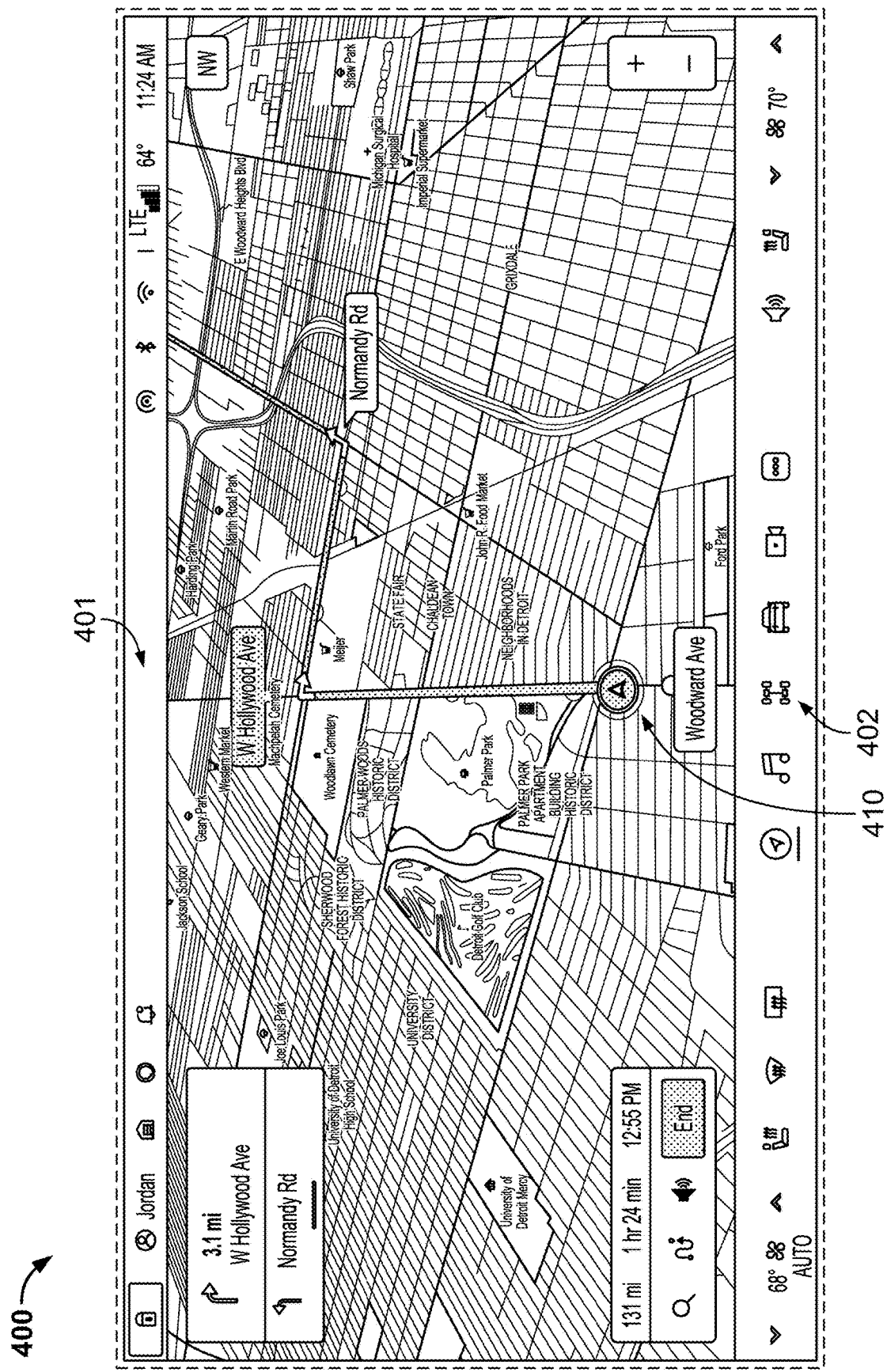
FIG. 4 shows a user interface displaying a navigational view, in accordance with some embodiments of the present disclosure.

FIG. 4 shows a user interface 400 displaying a navigational view in accordance with some embodiments of the present disclosure. FIG. 4 depicts an illustrative example of a user interface 400 of a vehicle that facilitates user interaction such as a touch screen of a vehicle infotainment system (e.g., located at a front and central location in the vehicle cabin proximate a driver, or other suitable location), although other user interfaces such as user device displays or projected displays (e.g., on a window or other surface) or augmented reality displays, or combinations thereof, may be utilized. Although a touch screen may be described herein, some or all of the elements of the user interface 400 can be accessed or modified via other user interface methods, such as voice control, gesture recognition, adjacent or remote buttons, or similar user interface methods. The exemplary user interface 400 includes an information panel 401, a selection panel 402, and a navigational display 410, although other visual and/or physical components may be included or substituted in other embodiments.

User interface 400 includes an information panel 401 that displays system information to the user and is positioned as an upper panel of the user interface 400, although other shapes and locations may be utilized as well. Elements of displayed system information include elements such as a user account icon, a Wi-Fi connection status icon, a clock, display brightness icon, outside weather and temperature, an alarm icon, a home icon, a Bluetooth status icon, a cellular connection status icon, or combinations thereof. One or more of the displayed elements of system information may be selected via user interface 400, such as by a user touching the portion of the user interface 400 that includes the element. Once selected, configuration or other parameters may be accessed or modified, such as by a pop-up of options on user interface 400, or changing some or all of user interface 400 to a different screen. In some embodiments, the user may logon to the user interface with an account (e.g., via connection to an external device), wherein the logon saves the user preferences for interactions with the elements of user interface 400. In this manner, user-specific settings may be maintained for each user, for example, in the context of swiping camera views on touch screen user interfaces, user-specific default screens, camera configurations, zooms, or swipe speeds.

User interface 400 includes a selection panel 402 that is positioned as a lower panel of the user interface 400 and allows the user to select (e.g., via user interface 400) and configure vehicle control systems, or to select icons representing applications of the vehicle or of an external device (e.g., a smartphone or other user electronic device). For example, configurable vehicle control systems include a temperature control system, a seat warming system, a windshield defroster system, a vehicle user interface sound control system, or combinations thereof. Other displayed icons on selection panel 402 represent applications such as a navigational application, a vehicle camera view application as described in more detail herein, a music player application, a movie player application, or additional external device or augmented reality applications. An external device's applications may be retrieved from the user's individual settings if a logon system is present in 401 and may be aggregated into a selectable list that is displayed as a pop-up or as a different screen on user interface 400 when a respective icon in 402 is selected.

User interface 400 includes a navigation display 410 that displays navigation information such as a map on the primary portion of user interface 400, such as when an icon on selection panel 402 that corresponds to the navigational application is selected. Navigation display 410 is connected to a navigational system (e.g., a global positioning and/or dead reckoning system) that provides relevant map and location information to be displayed. A point representing the current location of the vehicle is displayed on navigation display 410 and a target location may be selected or inputted by the user via user interface 400, wherein upon inputting a target location a corresponding route to said target location is also displayed. One or more additional pop-up displays on user interface 400 may be utilized to supply additional relevant information to the user, or to display additional icons that the user can select to configure settings relevant to the navigational application. For example, additionally displayed information may include a visual cue of the next turn direction, a distance to the next turn, a road name at which the next turn occurs, a total travel time to the target location, an estimated arrival time at the target location, and a total distance to the target location. The selectable icons represent configurable settings such as map zoom, navigational routing options, navigation system sound, and a setting to end, pause, or start navigation. The displayed map on navigational display 410 additionally includes landmark locations that are selectable by the user via user interface 400, wherein selecting a location results in the navigational system retrieving and displaying relevant information about said landmark location to the user.

Figure 5:
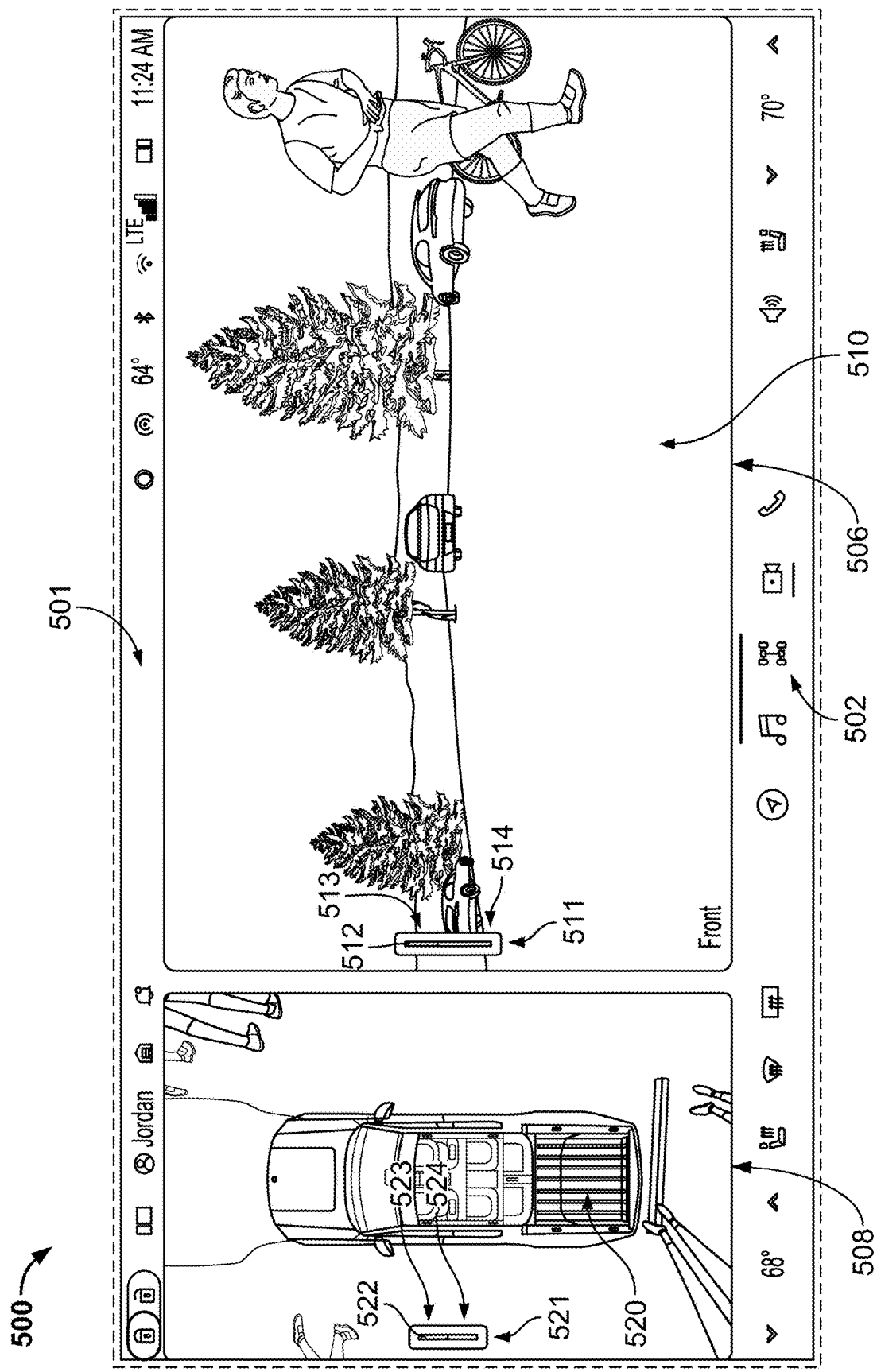
FIG. 5 shows the user interface displaying a front camera view and a top camera view of the vehicle, in accordance with some embodiments of the present disclosure.

FIG. 5 shows the user interface 500 displaying a front camera view 510 and a top camera view 520 of the vehicle, in accordance with some embodiments of the present disclosure. User interface 500 is a view accessed by the user such as via user interface 400, for example, by selecting the vehicle camera view application via selection panel 402, although the user may access the user interface 500 via other methods such as selecting a button on a steering wheel, voice commands, or other similar user interface methods. In some embodiments, the selection of the vehicle camera view application may be limited to certain circumstances, such as particular vehicle speeds and/or locations, sensor data, safety criteria, or the like. In some embodiments, the vehicle camera view application may be provided to the user without user input, for example, based on detection of a potential obstruction associated with particular camera views. Although the vehicle camera view application may be included with the information panel 501 and selection panel 502, in some embodiments and circumstances other information and interfaces may be provided on portions of the user interface 500, such as an overlay of a navigation screen, media control information, or climate controls.

The exemplary user interface 500 includes information panel 501 (e.g., having similar icons and displays to that of the previously described information panel 401), selection panel 502 (e.g., having similar icons and displays to that of the previously described selection panel 402, except with the vehicle camera view application selected), a primary camera display window 506, a secondary camera display window 508, a front camera view 510, a first indicator 511 that includes a bar 512 that includes a first portion 513 and a second portion 514, a top camera view 520, and a second indicator 521 that includes a bar 522 that includes a first portion 523 and a second portion 524, although other visual and/or physical components may be included or substituted in other embodiments.

User interface 500 includes a primary camera display window 506 that may be associated with one or more of the available camera views associated with vehicle 300 and displays one of the associated one or more camera views in the center of interface 500, although other shapes, sizes, and locations may be utilized as well. It will be understood that secondary camera display window 508 has similar icons and displays as primary camera display window 506, but is associated with a different one or more of the available camera views associated with vehicle 300 and displays one of the associated one or more camera views to the left of the camera view displayed in the primary camera display window 506, although other shapes, sizes, and locations may be utilized as well. As shown, secondary camera display window 508 is displayed side-by-side with primary camera display window 506. As used herein, side-by-side refers to the relative positional relationship between two views, windows, or other items. Side-by-side includes, for example, a left and right relative positional relationship and a top and bottom relative positional relationship. Two views or windows are considered side-by-side even if there is a space between them as shown, for example, in FIG. 5.

User interface 500 includes a front camera view 510 that is positioned in the primary camera display window 506 of the user interface 500, although other shapes, sizes, and locations of the camera view display may be utilized as well. If the vehicle does not include a front camera, or if a different camera view of the available camera views associated with the vehicle is selected (e.g., a default camera view specified by either user settings, a triggering event for providing the camera views, via logon, or manual configuration via user input), the front camera view may be substituted by another camera view of the available camera views associated with a vehicle within the initial primary section. Though not depicted, it should be understood that additional overlay displays and systems may be included in the front camera view display 510 (e.g., visual or audio warnings of object of nearby proximity to the vehicle, or a visual superimposed directional indicator of the vehicle's trajectory) in accordance with legal mandates or user-specified settings therein. For example, a user input such as a swipe or a touch on the display of front camera view 510 may result in additional elements displayed, or a switch to a different camera view of the available camera views associated with the vehicle.

User interface 500 includes a first indicator 511 that is rectangular in shape and is positioned as an overlay on front camera view 510, although other sizes, shapes, and locations may be utilized as well. First indicator 511 represents an ordered list of available camera views associated with the display of the front camera view 510, wherein said available camera views include a subset of the available camera views associated with the vehicle. Although not depicted, a pop-up icon may instead be displayed on the front camera view 510, wherein selection of said icon results in the display of the full first indicator 511, wherein the full indicator details said ordered list of available camera views to the user. For example, a user may touch a location within the primary section of user interface 500 to retrieve the full display of the first indicator 511.

First indicator 511 includes a bar 512 that is overlayed onto the display of first indicator 511 in a rectangular shape and represents which camera view of the available camera views associated with the display of the front camera view 510 is being displayed, although other sizes and shapes may be utilized as well. For example, bar 512 representing which camera view of the available camera views associated with the display of the front camera view 510 is being displayed may instead be represented as a car icon, with said available camera views marked on the corresponding locations on the car icon.

Bar 512 includes a first portion 513 and a second portion 514 that are distinguished in color, although distinguishing characteristics may be utilized as well in accordance with the size and shape of first indicator 511. The first portion 513 has a length that is equal to the ratio of the number one to the number of total number of available camera views for display within the front camera view 510 of the total bar length. The position of first portion 513 on the bar 512 indicates the camera view being displayed, corresponding to the delineated order represented by indicator 511. The second portion 514 represents the other camera views of the available camera views associated with front camera view 510 not being displayed, and includes the rest of the bar that is not included in first portion 513. In the above example where the bar 512 is a car icon, for instance, the direction of the displayed camera view may be highlighted, while directions of other available camera views not being displayed are highlighted in a different color. For example, the highlight corresponding to the direction of the displayed camera view may be in bright yellow, to indicate that said camera view is being currently displayed, while the directions of other available camera views not being displayed are highlighted grey, to indicate to the user that said camera views can be displayed but currently are not being displayed.

User interface 500 includes a top camera view 520 that is displayed in a secondary camera display window 508 of the user interface 500. The specifications of top camera view 520 are similar in function and display to that of front camera view 510. User interface 500 includes a second indicator 521 that is rectangular in shape and is positioned as an overlay on top camera view 520, although other sizes, shapes, and locations may be utilized as well. Second indicator 521 represents an ordered list of available camera views associated with the display of the top camera view 520, wherein said available camera views include a subset of the available camera views associated with the vehicle. The functionality and displays of second indicator 521, and of included elements such as a bar 522 that includes a first portion 523 and a second portion 524, are similar to the respectively corresponding elements within the first indicator 511.

Figure 6:
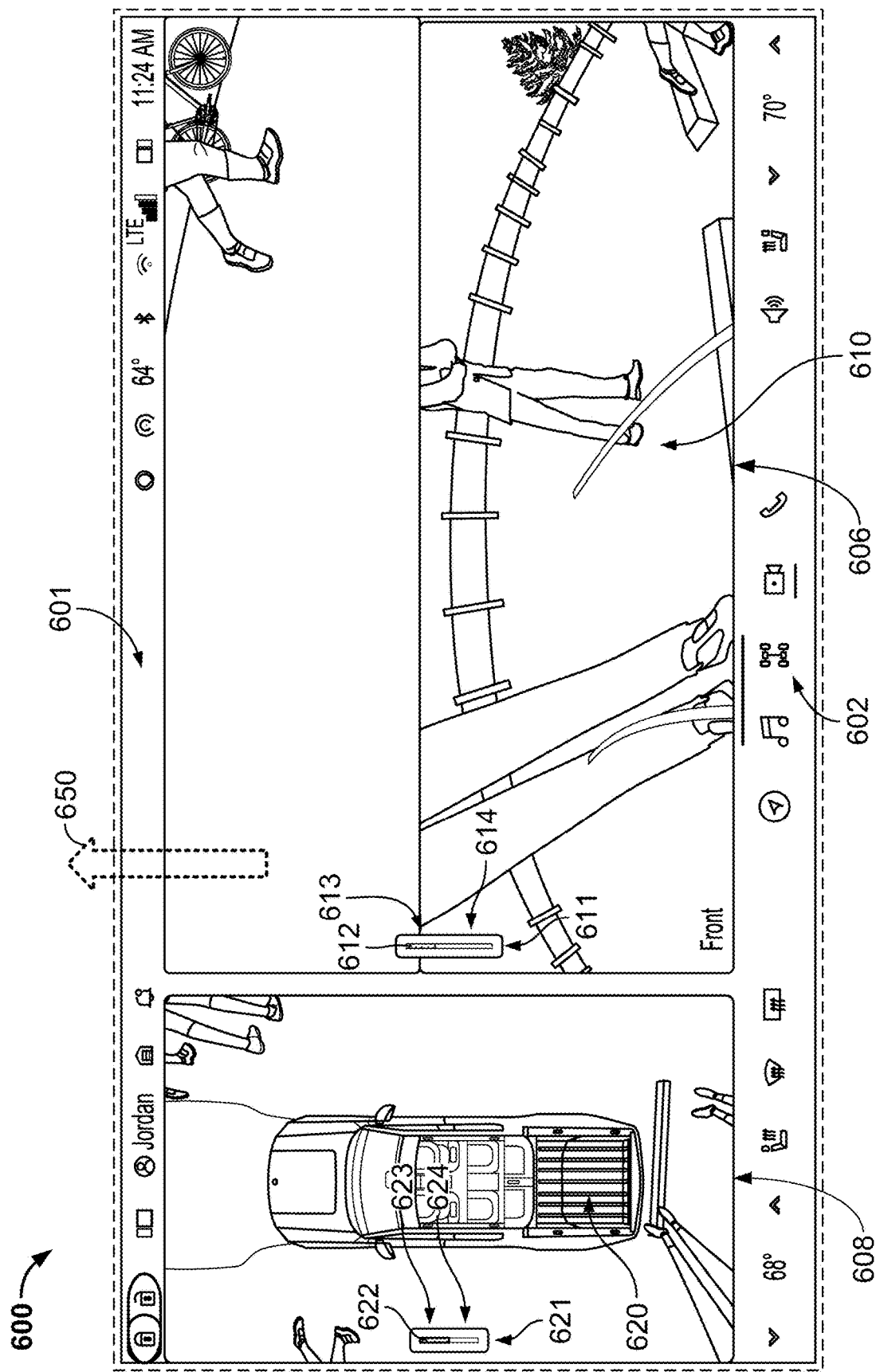
FIG. 6 shows the user interface displaying the top camera view and a transition from the front camera view to a rear camera view, in accordance with some embodiments of the present disclosure.

FIG. 6 shows the user interface displaying the top camera view 620 and a transition 610 from the front camera view to a rear camera view, in accordance with some embodiments of the present disclosure. User interface 600 is a view accessed, for example, when a swipe input 650 is detected from the user on the display of front camera view 510 within user interface 500. The exemplary user interface 600 includes information panel 601 (e.g., having similar icons and displays to that of the previously described information panel 401), selection panel 602 (e.g., having similar icons and displays to that of the previously described selection panel 502), a primary camera display window 606, a secondary camera display window 608, a transition 610 from the front camera view to the rear camera view, a first indicator 611 that includes a bar 612 that includes a first portion 613 and a second portion 614, a top camera view 620, and a second indicator 621 that includes a bar 622 that includes a first portion 623 and a second portion 624, although other visual and/or physical components may be included or substituted in other embodiments.

User interface 600 includes a primary camera display window 606 and a secondary camera display window 608, and it will be understood that these elements have similar displays and locations as that of primary camera display window 506 and secondary camera display window 508, respectively.

User interface 600 includes a transition 610 from the front camera view to a rear camera view in the primary camera display window 506, although the front camera view may be substituted with any initial first camera view of the available camera views associated with vehicle and the rear camera view may be replaced with any different second camera view of the available camera views associated with vehicle, both in accordance with the delineated ordered list represented by first indicator 511. The transition 610 may be a sliding push transition from the first camera view to the second camera view, as depicted herein, but may also include other transitions such as but not limited to a fade transition, an uncover transition, a flash transition, or a page peel transition.

User interface 600 includes a first indicator 611 that includes a bar 612 that includes first portion 613 and second portion 614. It is to be understood that these elements have similar icons and displays to the corresponding previously described elements first indicator 511, bar 512, first portion 513 and second portion 514. User interface 600 further includes a top camera view 620 in secondary camera display window 608 that includes a second indicator 621 that includes a bar 622 that includes a first portion 623 and a second portion 624, and it is to be understood that these elements have similar icons and displays to the corresponding previously described elements top camera view 520, second indicator 521, bar 522, first portion 523, and second portion 524, respectively.

FIG. 6 further includes a swipe input 650 on user interface 600 from a user, wherein said swipe input 650 is detected within the display of the front camera view 510 and that causes the transition 610 from a first camera view of the available camera views (e.g., the front camera view) to a different second camera view of the available camera views (e.g., the rear camera view). For example, the swipe input may be performed by the user and detected on the touch screen or another system (e.g., gesture recognition) as directed by a user command. Furthermore, the swipe input may be replaced by other inputs, such as a tap input on the touch screen instead of a swipe, an auditory instruction from the user, or a gaze input from the user, so long as the system is configured to process said replacement as a command to switch from the first camera view to the second camera view. Swipe input 650 includes a direction, wherein the selection of the second camera view of the available camera views is determined from both the ordered list of available camera views represented by first indicator 511 and the direction of the swipe input which accordingly determines the direction within the ordered list that will be used to select the second camera (e.g., swiping up results in moving down the ordered list to select the second camera view). For example, as indicated by first portion 513 in the depiction herein, the front camera view 510 is the top of the ordered list represented by first indicator 511. Therefore, for instance, a swipe down, resulting in moving up the ordered list to select the second camera view, would result in no available camera view able to be selected, and the front camera view 510 would therefore not transition from said downwards swipe input.

Figure 7:
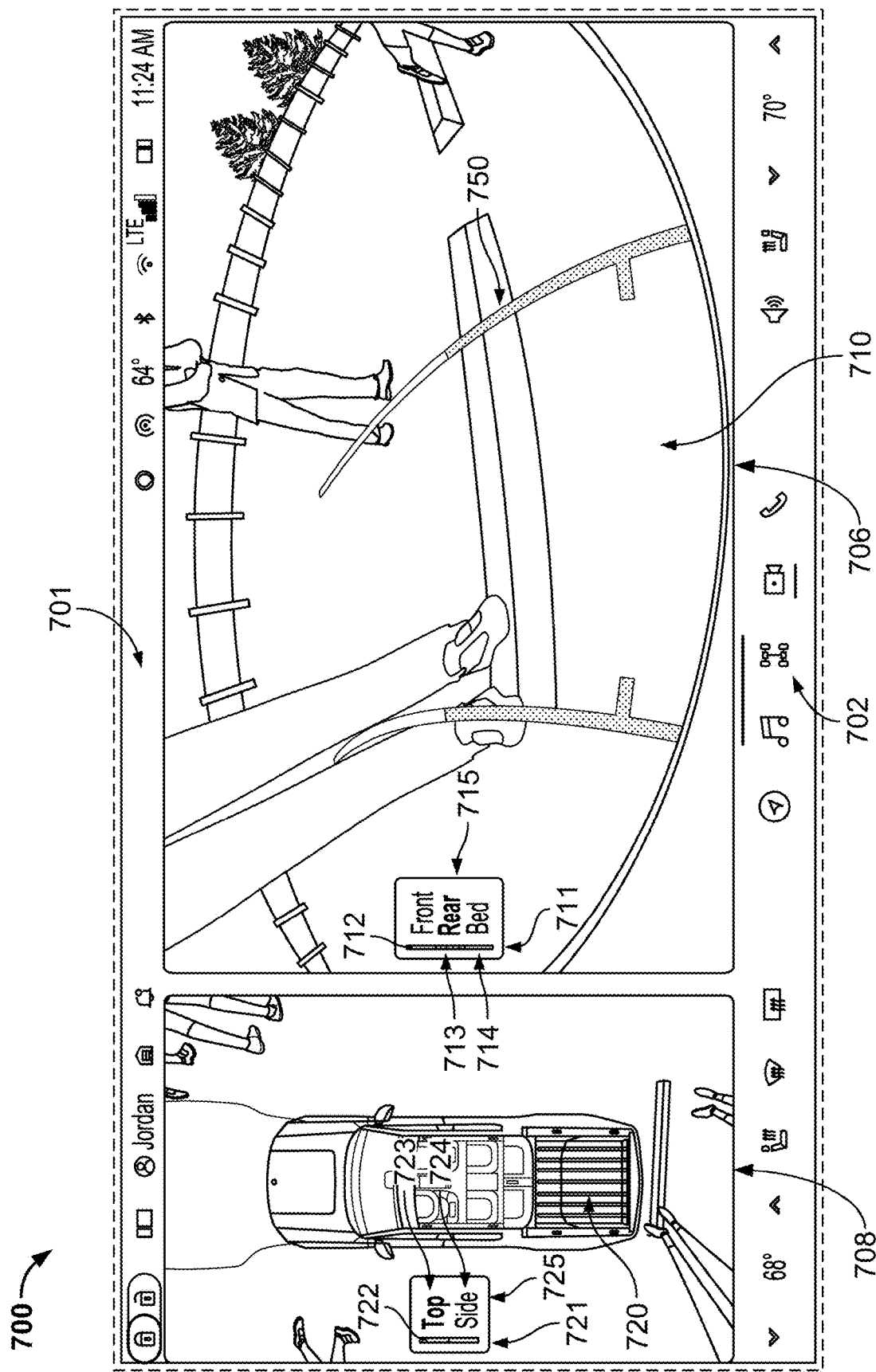
FIG. 7 shows the user interface displaying the top camera view and the rear camera view, in accordance with some embodiments of the present disclosure.

FIG. 7 shows the user interface 700 displaying the top camera view 720 and the rear camera view 710, in accordance with some embodiments of the present disclosure. User interface 700 is accessed, for example, when a swipe input 650 is detected from the user on the display of front camera view 510 within user interface 500 and the transition 610 (e.g., from the front camera view to the rear camera view) is completed. The exemplary user interface 700 includes information panel 701 (e.g., having similar icons and displays to that of the previously described information panel 401), selection panel 702 (e.g., having similar icons and displays to that of the previously described selection panel 502), a primary camera display window 706, a secondary camera display window 708, a rear camera view 710, a first indicator 711 that includes a bar 712 that includes a first portion 713, a second portion 714, and a description 715, a top camera view 720, a second indicator 721 that includes a bar 722 that includes a first portion 723, a second portion 724, a description 725, and a superimposed directional indicator 750, although other visual and/or physical components may be included or substituted in other embodiments.

User interface 700 includes a primary camera display window 706 and a secondary camera display window 708, and it will be understood that these elements have similar displays and locations as that of primary camera display window 506 and secondary camera display window 508, respectively.

User interface 700 includes a rear camera view 710 that is positioned in the primary camera display window 706 of the user interface 700, although other shapes, sizes, and locations of the camera view display may be utilized as well. If the vehicle does not include a rear camera, or if a different camera view of the available camera views associated with the vehicle is selected (e.g., if the swipe input 650 is in a different direction, or if the ordered list of available camera views represented by the first indicator 511 is arranged differently such that the second camera view is a different camera view), the rear camera view may be substituted by another camera view of the camera views associated with a vehicle within the initial primary section. It should be understood that, similar to front camera view 510, rear camera view 710 may include additional elements to be displayed, dependent on legal mandates, user-specified settings, or an additional user input therein.

User interface 700 includes a first indicator 711 that is rectangular in shape and is positioned as an overlay on rear camera view 710, although other sizes, shapes, and locations may be utilized as well. First indicator 711 includes a bar 712, wherein said bar 712 includes a first portion 713 and a second portion 714. First indicator 711 has similar icons and displays to that of previously described first indicator 511, and bar 712, first portion 713, and second portion 714 have similar icons and displays to that of previously described bar 512, first portion 513, and second portion 514, respectively, although the first portion 713 on the bar 712 that indicates the camera view being displayed, corresponding to the delineated order represented by first indicator 711, is now positioned appropriately to represent that the rear camera view 710 is being displayed instead of the front camera view 510.

First indicator 711 includes a description 715 as displayed text nearby bar 712, although variations in font, size, text color, and language may be utilized. The displayed text of description 715 describes the ordered list of available camera views represented by first indicator 711, wherein the displayed text is furthermore located in a position in accordance with bar 712, such that both bar 712 and said description 715 correctly correspond to the delineated order represented by first indicator 711. For example, in the previous depiction where the bar 512 (e.g., now bar 712) is a car icon, the displayed text included in description 715 of each available camera view may be located nearby the highlighted respective direction of said camera view. The description 715 may be configured, by default or by user selection, to be replaced by a different output (e.g., an audio output) or located in a different position, either on user interface 700 or even on an external device (e.g., on an instrument cluster or a smartphone application that may be connected to user interface 700 via the logon system included in information panel 701).

User interface 700 includes a top camera view 720 in secondary camera display window 708 that includes similar icons and displays to that of the previously described top camera view 520. Accordingly, the second indicator 721, included in top camera view 720, includes similar icons and displays to that of second indicator 521, and bar 722, which includes first portion 723 and second portion 724, have similar icons and displays to those of the previously described bar 522, first portion 523, and second portion 524, respectively. Bar 722 further includes a description 725, which has similar icons and displays to that of description 715, but altered to correspond accordingly to the ordered list of available camera views delineated in second indicator 721.

Rear camera view 710 includes a superimposed directional indicator 750 as an example of an additional element displayed on rear camera view 710 as described above. Superimposed directional indicator 750 displays, via two lines set a distance apart representative of the width of the vehicle, the estimated trajectory of the vehicle with respect to the displayed rear camera view 710, wherein the estimation may be calculated, for example, via processing circuitry contained within the vehicle, wherein said processing circuitry may receive inputs from other devices contained within the vehicle (e.g., a proximity sensor, a direction sensor, a motion sensor, or combinations thereof). Furthermore, superimposed directional indicator 750 may include additional elements, such as ticks along the two lines further detailing approximate distance to objects displayed on rear camera view 710, color changes of the lines corresponding to the distance of the vehicle to a proximate object in rear camera view 710, additional audio warnings or external visual alerts when the vehicle is too close to said proximate object, or combinations thereof.

Figure 8:
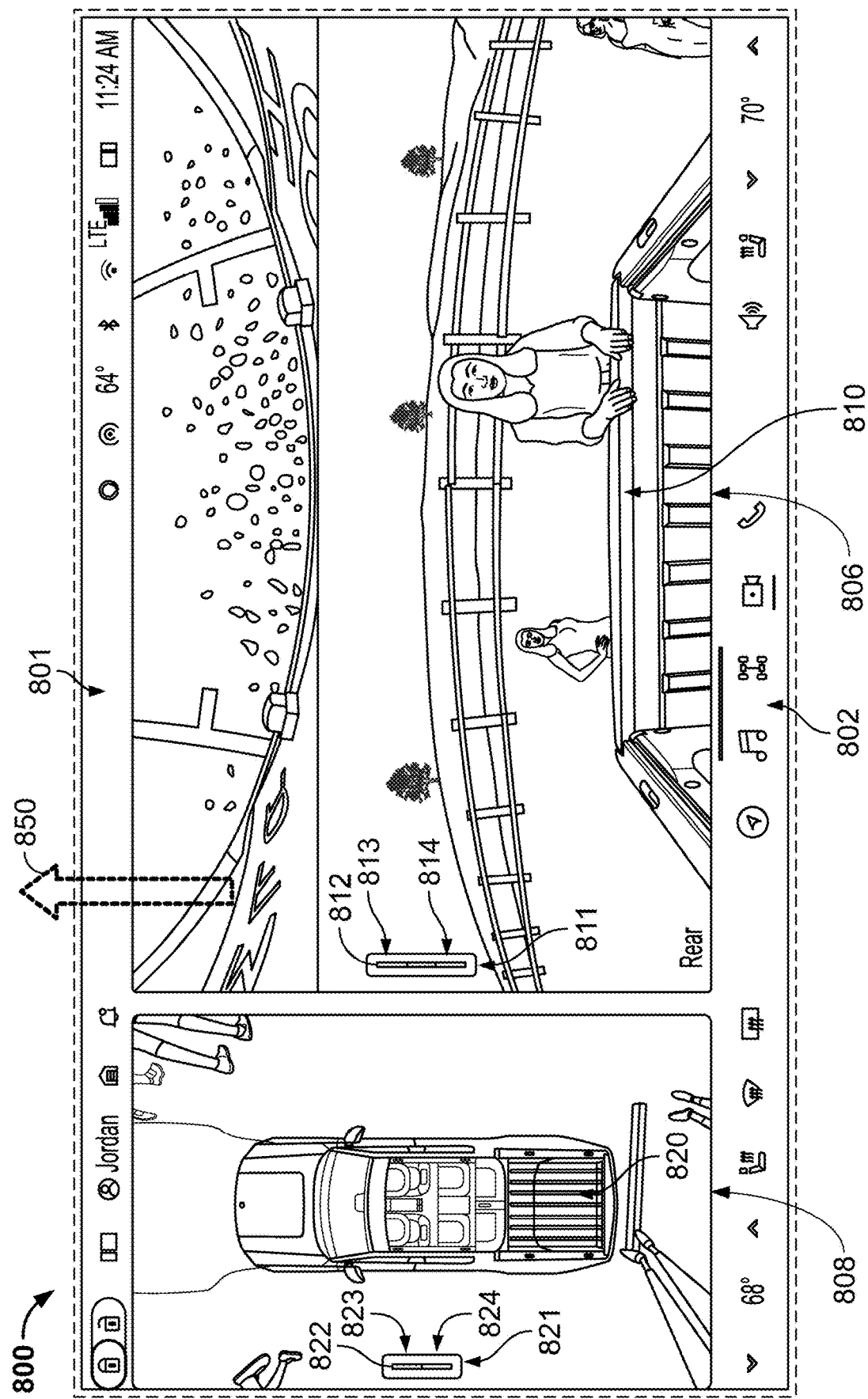
FIG. 8 shows the user interface displaying the top camera view and a transition from the rear camera view to a bed camera view, in accordance with some embodiments of the present disclosure.

FIG. 8 shows the user interface 800 displaying the top camera view 820 and a transition 810 from the rear camera view to a bed camera view, in accordance with some embodiments of the present disclosure. User interface 800 is a view accessed, for example, when a swipe input is detected from the user on the display of front camera view 710 within user interface 700. The exemplary user interface 800 includes information panel 801 (e.g., having similar icons and displays to that of the previously described information panel 401), selection panel 802 (e.g., having similar icons and displays to that of the previously described selection panel 502), a primary camera display window 806, a secondary camera display window 808, a transition 810 from the rear camera view to the bed camera view, a first indicator 811 that includes a bar 812 that includes a first portion 813 and a second portion 814, a top camera view 820, and a second indicator 821 that includes a bar 822 that includes a first portion 823 and a second portion 824, although other visual and/or physical components may be included or substituted in other embodiments.

User interface 800 includes a primary camera display window 806 and a secondary camera display window 808, and it will be understood that these elements have similar displays and locations as that of primary camera display window 506 and secondary camera display window 508, respectively.

User interface 800 includes a transition 810 from the rear camera view to a bed camera view in the primary camera display window 806, although the rear camera view may be substituted with any prior camera view of the available camera views associated with vehicle and the bed camera view may be replaced with any different camera view of the available camera views associated with the vehicle, both in accordance with the delineated ordered list represented by first indicator 711. The transition 810 may be a sliding push transition from the first camera view to the second camera view, as depicted herein, but may also include other transitions such as but not limited to a fade transition, an uncover transition, a flash transition, or a page peel transition.

User interface 800 includes a first indicator 811 that includes a bar 812 that includes first portion 813 and second portion 814. It is to be understood that these elements have similar icons and displays to the corresponding previously described elements first indicator 711, bar 712, first portion 713 and second portion 714. User interface 800 further includes a top camera view 820 in secondary camera display window 808 that includes a second indicator 821 that includes a bar 822 that includes a first portion 823 and a second portion 824, and it is to be understood that these elements have similar icons and displays to the corresponding previously described elements top camera view 520, second indicator 521, bar 522, first portion 523, and second portion 524, respectively.

FIG. 8 further includes a swipe input 850 from a user on user interface 800, wherein said swipe input is detected on rear camera view 710 and has similar input methods and types as that of swipe input 650 and similarly includes a swipe direction that maintains a similar function as that of swipe input 650 in determining the second camera view to be selected. For example, in the depiction herein, swipe input 850 is in the up direction (e.g., the swipe up results in moving down the ordered list to select, if possible, the second camera view); however, if the swipe were instead in the down direction, the corresponding moving up the ordered list would result in the subsequent selection of the top camera view 510 as the second camera view.

Figure 9A:
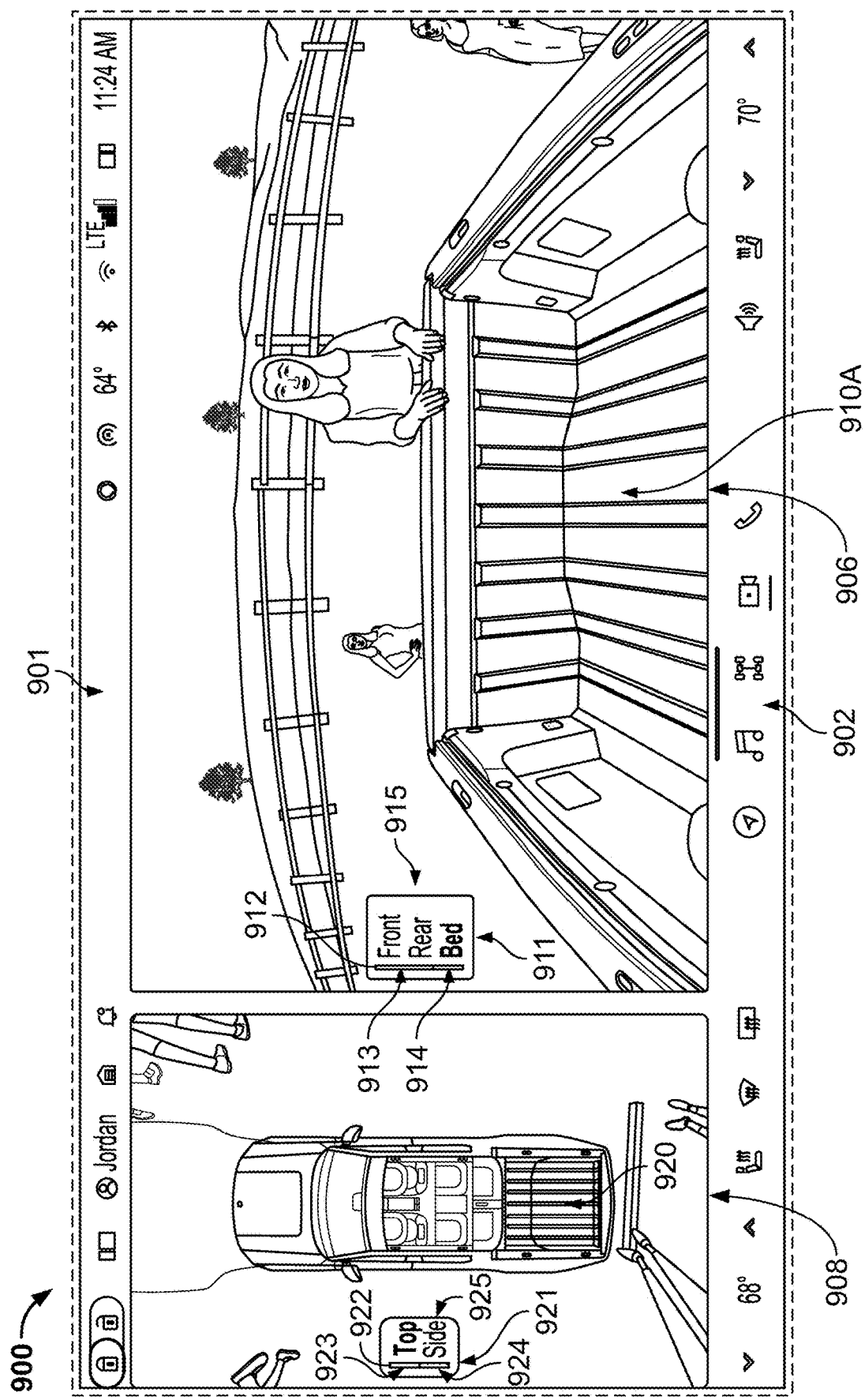
FIGS. 9A-9C shows the user interface displaying the top camera view and the bed camera view with panning, in accordance with some embodiments of the present disclosure.
Figure 9B:
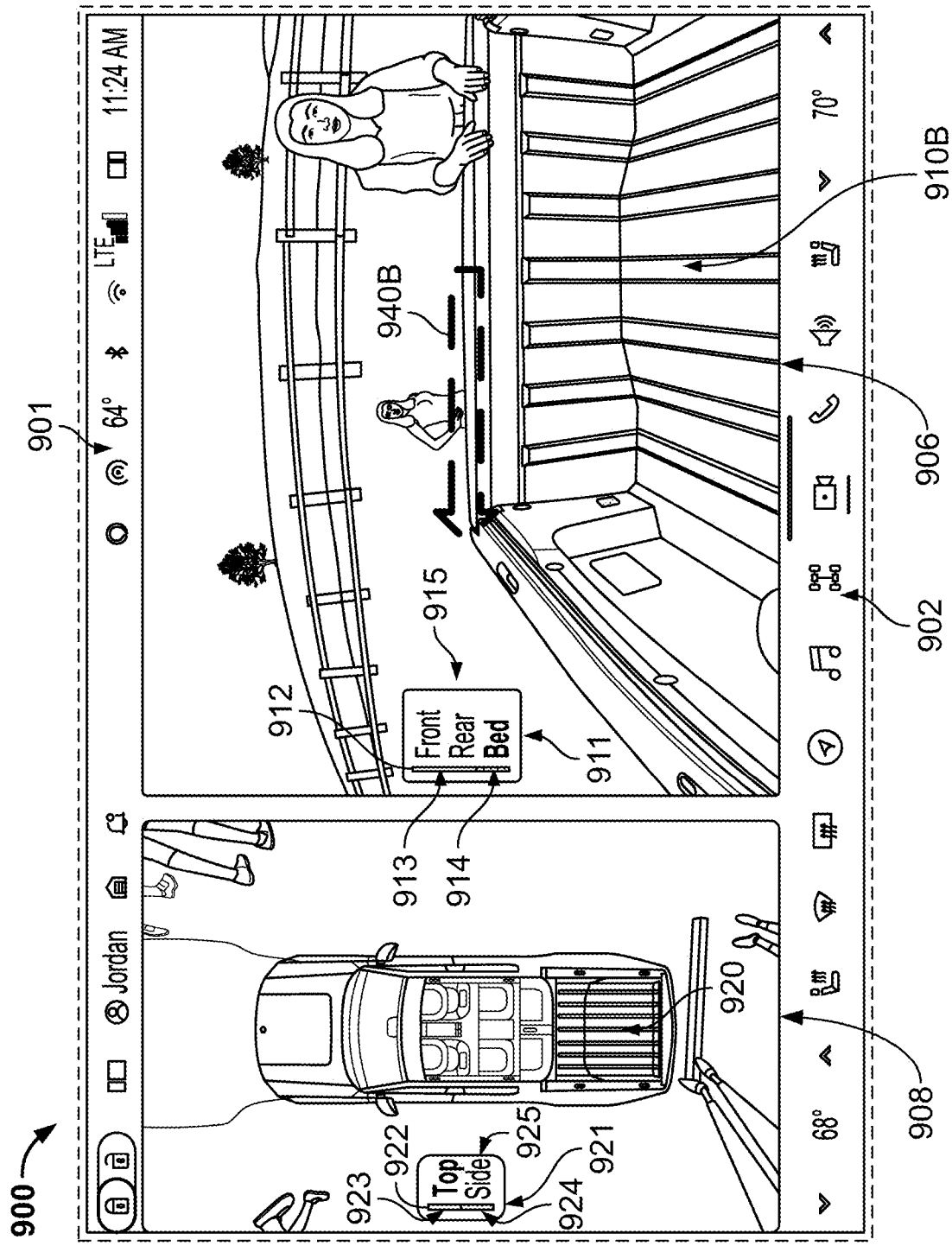
Figure 9C:
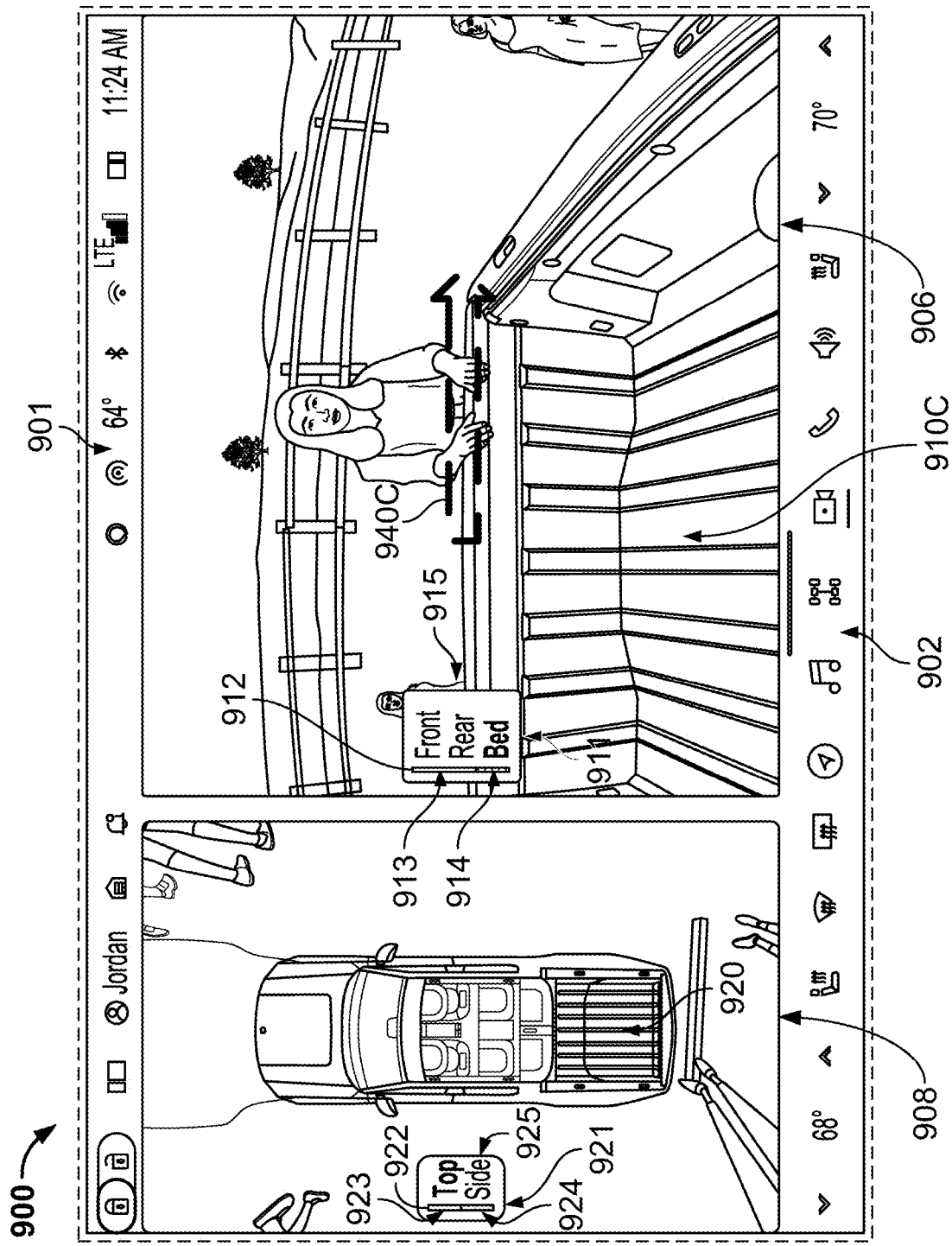

FIGS. 9A-9C shows the user interface displaying the top camera view and the bed camera view with panning, in accordance with some embodiments of the present disclosure. FIG. 9A shows the user interface 900 displaying the top camera view 920 and the bed camera view 910A, in accordance with some embodiments of the present disclosure. User interface 900 is accessed, for example, when a swipe input 850 is detected from the user on the display of rear camera view 710 within user interface 700 and the transition 810 (e.g., from the rear camera view to the bed camera view) is completed. The exemplary user interface 900 includes information panel 901 (e.g., having similar icons and displays to that of the previously described information panel 401), selection panel 902 (e.g., having similar icons and displays to that of the previously described selection panel 502), a primary camera display window 506, a secondary camera display window 508, a bed camera view 910, a first indicator 911 that includes a bar 912 that includes a first portion 913, a second portion 914, and a description 915, a top camera view 920, a second indicator 921 that includes a bar 922 that includes a first portion 923, a second portion 924, and a description 925, although other visual and/or physical components may be included or substituted in other embodiments.

User interface 900 includes a primary camera display window 906 and a secondary camera display window 908, and it will be understood that these elements have similar displays and locations as that of primary camera display window 506 and secondary camera display window 508, respectively.

User interface 900 includes a bed camera view 910A that is positioned in the primary camera display window 906 of the user interface 900, although other shapes, sizes, and locations of the camera view display may be utilized as well. If the vehicle does not include a bed camera, or if a different camera view of the available camera views associated with the vehicle is selected (e.g., if the swipe input 850 is in a different direction, or if the ordered list of available camera views represented by the first indicator 711 is arranged differently such that the second camera view is a different camera view), the rear camera view may be substituted by another camera view of the camera views associated with a vehicle within the initial primary window. It should be understood that, similar to front camera view 510, bed camera view 910A may include additional elements to be displayed, dependent on legal mandates, user-specified settings, or an additional user input therein.

User interface 900 includes a first indicator 911 that is rectangular in shape and is positioned as an overlay on front camera view 910, although other sizes, shapes, and locations may be utilized as well. First indicator 911 includes a bar 912, wherein said bar 912 includes a first portion 913, a second portion 914, and a description 915. First indicator 911 has similar icons and displays to that of previously described first indicator 711, and bar 912, first portion 913, second portion 914, and description 915 have similar icons and displays to that of previously described bar 712, first portion 713, second portion 714, and description 715, respectively, although the first portion 913 on the bar 912 that indicates the camera view being displayed, corresponding to the delineated order represented by first indicator 911, is now positioned appropriately to represent that the bed camera view 910 is being displayed instead of the rear camera view 710.

User interface 900 includes a top camera view 920 in secondary camera display window 908 that includes similar icons and displays to that of the previously described top camera view 520. Accordingly, the second indicator 921, included in top camera view 920, includes similar icons and displays to that of second indicator 521, and bar 922, which includes first portion 923, second portion 924, and description 925 have similar icons and displays to those of the previously described bar 522, first portion 523, second portion 524, and description 725, respectively.

FIG. 9B shows the above described user interface 900; however, user interface 900 displays a panned bed camera view 910B (i.e., panning the bed camera view 910A) in response to additional user swipe input 940B, in accordance with some embodiments of the present disclosure. It will be understood that, should the bed camera view 910A be substituted with another camera view, or altered to include additional elements as described previously, that the panned bed camera view 910B will be updated accordingly. For example, should the bed camera view 910A be replaced with the front camera view 510, then the panned bed camera view 910B will be replaced with a panned front camera view.

FIG. 9B includes a leftwards user swipe input 940B in the display in the primary portion of user interface 900 (e.g., bed camera view 910A) that results in the panning of said display. For example, a leftwards swipe may accordingly pan the camera view leftwards, as depicted in FIG. 9B. However, it will be understood that the direction of panning corresponding to the direction of the user swipe input may be changed, via user specification, legal mandates, designer choice, or some combination thereof. For example, a mirror input option may be available for the user to select, wherein selecting said option may therefore result in the leftwards user swipe input 940B commanding the camera view to pan right until the mirror input option is subsequently turned off. It will also be understood that the leftwards user swipe input 940B may be substituted by, for instance, a voice command (e.g., the user saying "pan left"), a gaze tracker, a command from an external user interface (e.g., the user swipes left on another user interface, and a resulting command is sent directly to user interface 900), or any other system or method not listed herein with the explicit result of a command to the user interface 900 to pan the bed camera view 910A.

FIG. 9C shows the above described user interface 900; however, user interface 900 displays a panned bed camera view 910C (i.e., panning the bed camera view 910A) in response to additional user swipe input 940C, in accordance with some embodiments of the present disclosure. It will be understood that user swipe input 940C shares similar input features and configurations as the user swipe input 940B, but accordingly adjusted to reflect that swipe input 940C is in the rightwards direction, and that user swipe input 940B is in the leftwards direction. Similarly, panned bed camera view 910C shares similar icons and displays of panned bed camera view 910B, but accordingly adjust to reflect that panned camera view 910C is panned in a rightwards direction, and panned camera view 910B is panned in a leftwards direction. It will be further understood that the left and right user swipe inputs 940B and 940C may be input not only when bed camera view 910A is displayed. For example, the user may decide to swipe downwards (i.e., resulting in a transition up to the rear camera view 710) and then pan the rear camera view using the left and right swipe inputs. For example, the user may decide to swipe left and right on the display of top camera view 920, in order to pan said top camera view.

Figure 10:
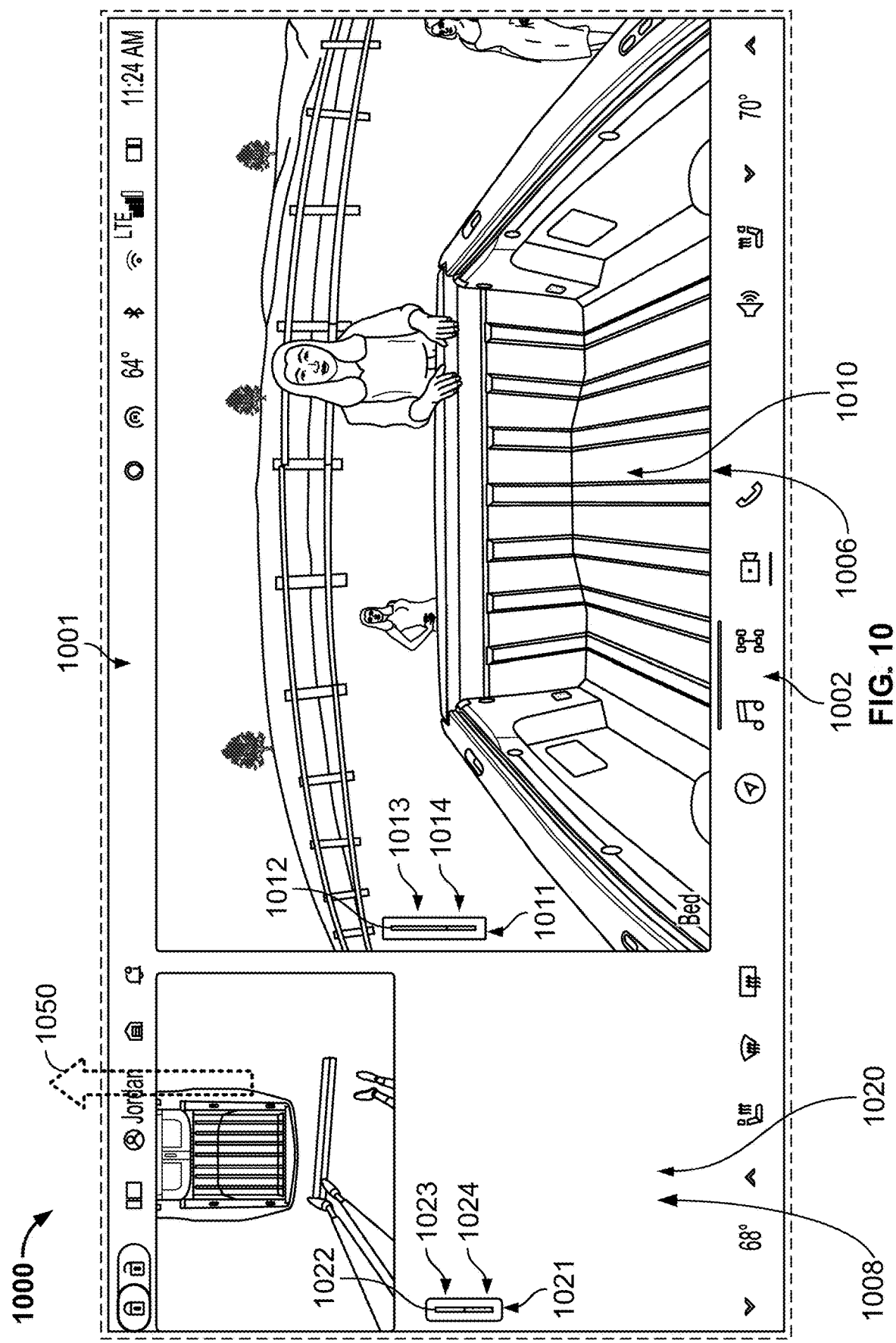
FIG. 10 shows the user interface displaying the bed camera view and a transition from the top camera view to left and right-side camera views, in accordance with some embodiments of the present disclosure.

FIG. 10 shows the user interface 1000 displaying the bed camera view 1010 and a transition 1020 from the top camera view 920 to left and right side camera views, in accordance with some embodiments of the present disclosure. User interface 1000 is a view accessed, for example, when a swipe input is detected from the user on the display of top camera view 920 within user interface 900. The exemplary user interface 1000 includes information panel 1001 (e.g., having similar icons and displays to that of the previously described information panel 401), selection panel 1002 (e.g., having similar icons and displays to that of the previously described selection panel 502), a primary camera display window 1006, a secondary camera display window 1008, a bed camera view 1010, a first indicator 1011 that includes a bar 1012 that includes a first portion 1013, and a second portion 1014, a transition 1020 from the top camera view to a left and right side camera view, a second indicator 1021 that includes a bar 1022 that includes a first portion 1023, and a second portion 1024, although other visual and/or physical components may be included or substituted in other embodiments.

User interface 1000 includes a primary camera display window 1006 and a secondary camera display window 1008, and it will be understood that these elements have similar displays and locations as that of primary camera display window 506 and secondary camera display window 508, respectively.

User interface 1000 includes a bed camera view 1010 in the primary camera display window 1006 that has similar icons and displays as that of bed camera view 910. Furthermore, user interface 1000 also includes a first indicator 1011 that includes a bar 1012 that includes first portion 1013 and second portion 1014, and it is to be understood that these elements have similar icons and displays to the corresponding previously described elements first indicator 911, bar 912, first portion 913, and second portion 914.

User interface 1000 includes a transition 1020 from a top camera view to a left and right side camera view in secondary camera display window 1008, although the top camera view may be substituted with any first camera view of the available camera views associated with vehicle and the bed camera view may be replaced with any different second camera view of the available camera views associated with the vehicle, both in accordance with the delineated ordered list represented by second indicator 921. For example, in the depiction herein, the first portion 923 indicates that the top camera view is the top of the ordered list represented by second indicator 921; therefore, a swipe downwards, which results in moving up the ordered list to select the second camera view, would result in no available camera view being selected, and the top camera view would not transition from said downwards swipe input. It is to be understood that, in the ordered list represented by second indicator 1021, a side view represents the simultaneous display of left and right side camera views. The transition 1010 may be a sliding push transition from the first camera view to the second camera view, as depicted herein, but may also include other transitions such as but not limited to a fade transition, an uncover transition, a flash transition, or a page peel transition.

User interface 1000 includes a second indicator 1021 that includes a bar 1022 that includes a first portion 1023 and a second portion 1024, and it is to be understood that these elements have similar icons and displays to the corresponding previously described elements top camera view 520, second indicator 521, bar 522, first portion 523, and second portion 524, respectively.

FIG. 10 includes a swipe input 1050 from a user on user interface 1000, wherein said swipe input is detected on top camera view 920 and has similar input methods and types as that of swipe input 650 and similarly includes a swipe direction that maintains a similar function as that of swipe input 650 in determining the second camera view to be selected, with the exception that the according delineated ordered list is represented by second indicator 1021, and not by first indicator 1011.

Figure 11:
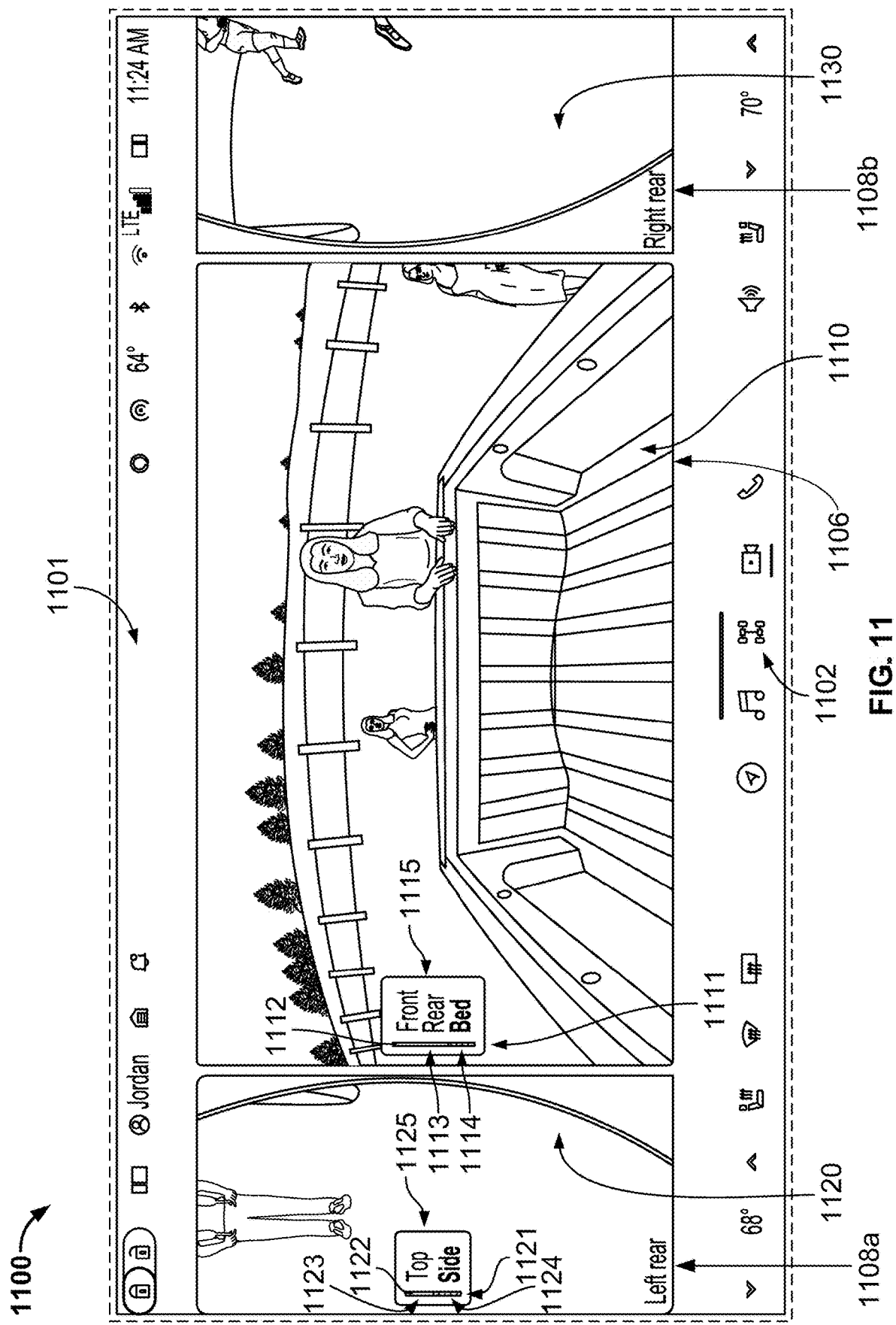
FIG. 11 shows the user interface displaying the bed camera view and the left and right-side camera views, in accordance with some embodiments of the present disclosure.

FIG. 11 shows the user interface 1100 displaying the bed camera view 1110 and the left and right camera views 1120 and 1130, respectively, in accordance with some embodiments of the present disclosure. User interface 1100 is accessed, for example, when a swipe input 1050 is detected from the user on the display of top camera view 920 within user interface 900 and the transition 1020 (e.g., from the top camera view to the left and right side camera views) is completed. The exemplary user interface 1100 includes information panel 1101 (e.g., having similar icons and displays to that of the previously described information panel 401), selection panel 1102 (e.g., having similar icons and displays to that of the previously described selection panel 502), a primary camera display window 1106, a first secondary camera display window 1108a, a second secondary camera display window 1108b, a bed camera view 1110, a first indicator 1111 that includes a bar 1112 that includes a first portion 1113, a second portion 1114, and a description 1115, a left camera view 1120, a second indicator 1121 that includes a bar 1122 that includes a first portion 1123, a second portion 1124, a description 1125, and right side camera view 1130, although other visual and/or physical components may be included or substituted in other embodiments.

User interface 1100 includes a primary camera display window 1106 and a first secondary camera display window 1108a, and it will be understood that these elements have similar displays and locations as that of primary camera display window 506 and secondary camera display window 508, respectively. User interface 1100 further includes a second secondary camera display window 1108b, and it will be understood that said second secondary display window 1108b will have similar displays to that of 1108a, but will be displayed in a different secondary location (e.g., right, instead of left, of primary camera display window 1106), and will display a different camera view of the camera views associated with first secondary camera display 1108a, although other locations and displays may be utilized as well.

User interface 1100 includes a bed camera view 1110 in the primary camera display window 1106 that has similar icons and displays as that of bed camera view 910. Furthermore, user interface 1100 also includes a first indicator 1111 that includes a bar 1112 that includes first portion 1113, second portion 1114, and description 1115, and it is to be understood that these elements have similar icons and displays to the corresponding previously described elements first indicator 911, bar 912, first portion 913, second portion 914, and description 915.

User interface 1100 includes a left camera view 1120 and a right camera view 1130, wherein the left camera view 1120 is displayed in a position left of the bed camera view 1110 in the primary section of user interface 1100 and the right camera view 1130 is positioned right of the bed camera view 1110 in the primary section of user interface 1100, although combinations of other shapes, sizes, and locations for either one or both of said camera view displays may be utilized as well. If the vehicle does not include a left camera, a right camera, or both said cameras, or if a different camera view of the available camera views associated with the vehicle is selected (e.g., if the swipe input 850 is in a different direction, or if the ordered list of available camera views represented by the second indicator 920 is arranged differently such that the second camera view is a different camera view), the left camera view, right camera, or both may be substituted by another camera view of the one or more camera views associated with the vehicle. It should be understood that, similar to top camera view 520, left camera view 1120 and right camera view 1130 may include additional elements to be displayed, dependent on legal mandates, user-specified settings, or an additional user input therein.

In some embodiments, left camera view 1120 and right camera view 1130 are selected based on which primary camera view is being displayed. For example, if the primary camera view is a rear camera view, then left camera view 1120 is selected to be a left rear camera view and right camera view 1130 is selected to be a right rear camera view as shown in FIG. 11. As another example, if the primary camera view is a front camera view, then left camera view 1120 is selected to be a left front camera view and right camera view 1130 is selected to be a right front camera view. The different side views can be selected from different cameras or, for example, by cropping a fish eye side view.

User interface 1100 includes a second indicator 1121 that is rectangular in shape, is positioned as an overlay on left camera view 1120, although other shapes, sizes, and locations may be utilized as well, and includes a bar 1122 that includes a first portion 1123, a second portion 1124, and a descriptor 1125. Second indicator 1121 has similar icons and displays to that of previously described second indicator 521, and bar 1122, first portion 1123, second portion 1124, and descriptor 1125 have similar icons and displays to that of previously described bar 522, first portion 523, second portion 524, and descriptor 725, respectively, although the first portion 1123 on the bar 1122 that indicates the camera view being displayed, corresponding to the delineated order represented by first indicator 1121, is now positioned appropriately to represent that the left and right camera views are being displayed instead of the rear camera view 520 (e.g., first portion 1123 indicates that the side view is being displayed).

Figure 12:
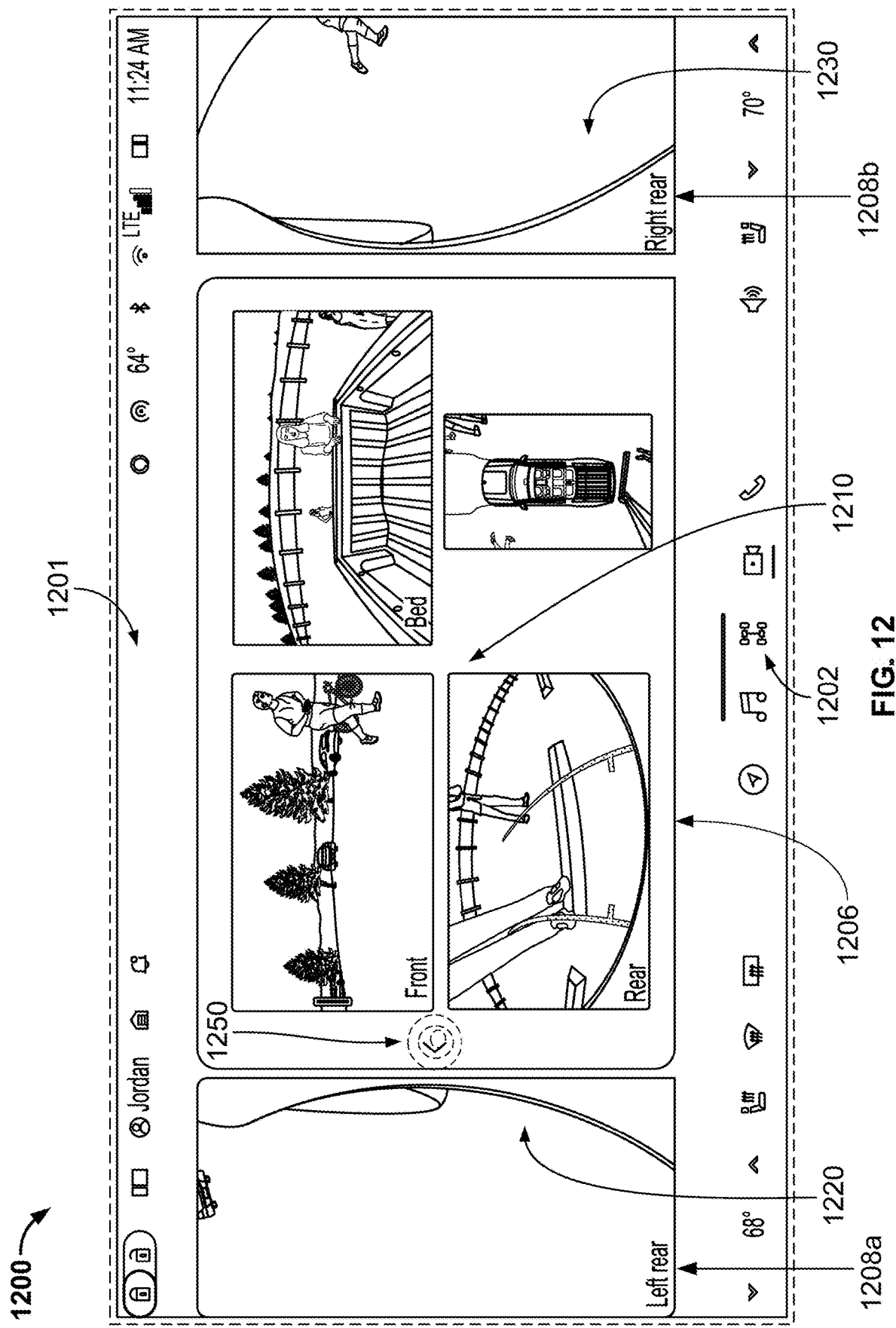
FIG. 12 shows the user interface displaying a mosaic view of the available camera views associated with the vehicle, in accordance with some embodiments of the present disclosure.

FIG. 12 shows the user interface 1200 displaying a mosaic view 1210 of the available camera views associated with the vehicle, in accordance with some embodiments of the present disclosure. User interface 1200 is a view accessed, for example, when a touch input is detected from the user on first indicator 1111 within user interface 1100. In some embodiments, user interface 1200 is accessed when a touch input is detected over first indicator 1111. The exemplary user interface 1200 includes information panel 1201 (e.g., having similar icons and displays to that of the previously described information panel 401), selection panel 1202 (e.g., having similar icons and displays to that of the previously described selection panel 502), a primary camera display window 1106, a first secondary camera display window 1108a, a second secondary camera display window 1108b, a mosaic view 1210, a left side camera view 1220, a right side camera view 1230, and a user selection input 1250, although other visual and/or physical components may be substituted or included in other embodiments.

User interface 1200 includes a primary camera display window 1206, a first secondary camera display window 1208a, and a second secondary camera display window 1208b, and it will be understood that these elements have similar displays and locations as that of primary camera display window 506, first secondary camera display window 1108b, and second secondary camera display window 1108b, respectively.

User interface 1200 includes a mosaic view 1210 that is positioned in the primary camera display window 1206 of the user interface 1200 and replaces the primary camera view in said primary section (e.g., the previously described bed camera view 1110) with simultaneously displayed views of the available camera views associated with the vehicle, although other shapes, sizes, and locations of the mosaic camera view display may be utilized as well. A selection by the user detected on any of the displayed camera views in the mosaic view results in the selected camera view being displayed in the primary section of the user interface 1200 (e.g., selecting the front camera view from the mosaic would result in displaying said front camera view only on the primary portion of user interface 1200, with similar icons and displays to that of the previously described front camera view 510). The mosaic view may be substituted with another method of delineating of the available camera views associated with the vehicle. For example, an audio system, within the vehicle or an externally connected application (e.g., a smartphone application connected with the logon system described above) may verbally state the available camera views, or a separate device external from user interface 1200 may contain the text list or display the mosaic view. Alternative selection methods of a camera view to be displayed of the available camera views may also be utilized. For example, a user selection of a camera view from the mosaic view may occur via audio or gaze detection systems.

User interface 1200 includes a left camera view 1220 and a right camera view 1230, which have similar icons and displays as the previously described left camera view 1120 and the previously described right camera view 1130, respectively.

FIG. 12 further includes a selection input 1250 from the user, wherein the detection of the user selecting the first indicator (e.g., the previously described first indicator 1111) results in the display of the mosaic view 1210. It is to be understood that, in the depiction herein, selection input 1250 is a tap directly on said first indicator, but other methods and systems that are configured to similarly display the mosaic view 1210 may be utilized, and therefore the selection input 1250 from the user may be accordingly different. For example, if the bar 1122 included, either as an added function or by a user-specified setting, an additional feature when a tap on the first indicator is detected, the selection input 1250 to display the mosaic view may be altered accordingly to prevent overlap of user inputs for different functions. For example, the selection input 1250 may be, instead of a tap input on the indicator, a voice command (e.g., the user says "mosaic"), a gaze command, a circular motion inputted on the touch screen, an input with multiple fingers, combinations thereof, or additional methods and systems not listed herein that are configured explicitly to display the mosaic view as a result.

In some embodiments, a different mosaic view may be displayed when a touch input is detected over second indicator 1121 of FIG. 11. For example, when a touch input is detected over second indicator 1121, a mosaic view may be displayed within first secondary camera display window 1108a and right camera view 1130 within second secondary camera display window 1108b may be removed. The mosaic view in first secondary display window 1108a may include a smaller version of the top camera view 920 in the upper region of display window 1108a and smaller versions of left and right cameras views 1120 and 1130 side-by-side in the bottom region of display window 1108a.

Figure 13:
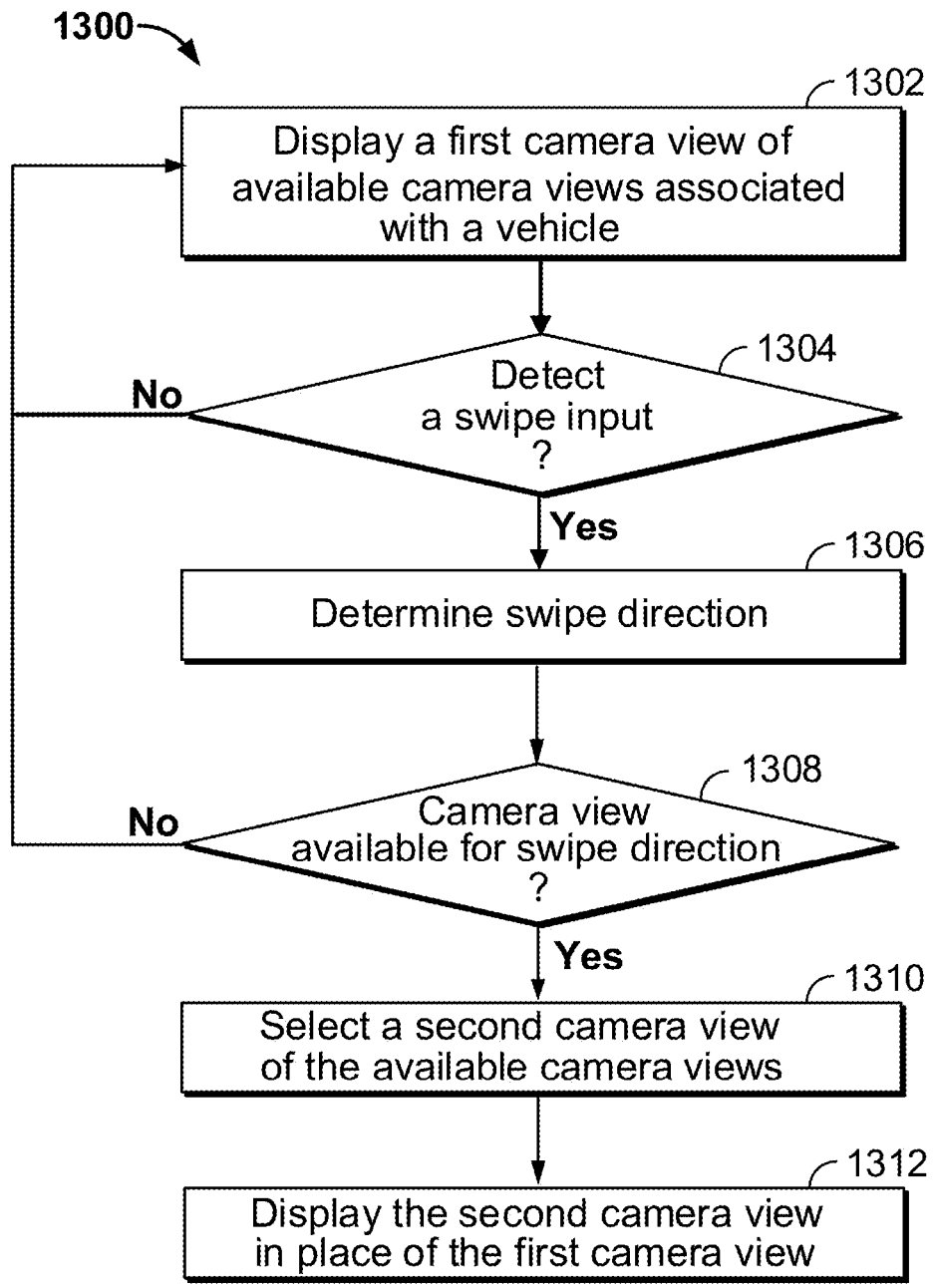
FIG. 13 shows a flowchart for a process for switching from a first camera view to a second camera view in response to detecting a swipe input, in accordance with some embodiments of the present disclosure.

FIG. 13 shows a flowchart 1300 for a process for switching from a first camera view to a second camera view in response to detecting a swipe input, in accordance with some embodiments of the present disclosure. Although FIG. 13 is described in the context of the particular structures, components, and processing of the present disclosure, and although a particular order and flow of steps are depicted in FIG. 13, it will be understood that in some embodiments, one or more of the steps may be modified, moved, removed, or added, and that the order of steps depicted in FIG. 13 may be modified.

Exemplary steps for switching from a first camera view to a second camera view in response to detecting a swipe input begins at step 1302, where a user interface (e.g., the previously described user interface 500) displays a first camera view of available camera views associated with a vehicle (e.g., the previously described vehicle that includes more than one attached cameras). Said user interface may facilitate user interaction, such as the touch screen of a vehicle infotainment system (e.g., located at a front and central location in the vehicle cabin proximate a driver, or other suitable location), or may be another user interface such as a user device display, a projected display, an augmented reality display, or combinations thereof. The display of the first camera view is located on the user interface, for instance in a primary portion of the user interface and within the touch screen, although other locations, shapes, and sizes of the display may be utilized as well. However the display of the first camera view is set, an input from a user may be detected and associated with said display, and processing may continue to step 1304.

At step 1304, the system detects a user input and further determines if said input is an appropriate swipe input. For example, in the depiction herein where the display of the first camera view is in a primary portion of the touch screen user interface, a detected user input may be appropriately considered a swipe input if said input occurs on the display of the first camera view. In response to detecting a determined swipe input ("Yes" at 1304), the rule verification proceeds to step 1306. In response to detecting no swipe input ("No" at 1304), the process loops to step 1302, where the first camera view of available camera views associated with a vehicle continues to be displayed.

At step 1306, the system, via processing circuitry, determines the direction of the detected swipe input from step 1304. Directions may be specified within the system, or by the user via the user-specified settings, to only include certain directions. For example, the system may be configured to only detect upwards and downwards directions on the user interface, wherein the horizontal (e.g., left and right on the user interface) length of a swipe may be ignored for purposes of switching camera views (e.g., may be used for panning within displayed camera views). Once the swipe direction is determined, processing may continue to step 1308.

At step 1308, the system utilizes the determined swipe direction from step 1306 in order to determine if a second camera view is available according to said swipe direction, using the ordered list represented by an indicator associated with the display of the first camera view. The swipe direction may correspond to a different direction of movement along the ordered list. For example, as previously described in the depiction herein, an upwards direction swipe may result in moving down the ordered list, although the corresponding direction of movement along the ordered list may be altered within the system or via settings stored in a user logon (e.g., the upwards direction swipe may be configured to result in moving up the ordered list instead). If there is an available second camera view for the swipe direction ("Yes" at 1308), the rule verification proceeds to step 1310. For example, if an upwards direction swipe results in moving down the ordered list, and there is a second camera view down the ordered list, then there is an available second camera view for said swipe direction. If there is not an available second camera view for the swipe direction ("No" at 1308), the process loops to step 1302, where the first camera view of available camera views associated with a vehicle continues to be displayed. For example, if the first camera view is already at the bottom of the ordered list, and an upwards direction swipe results in moving down the ordered list, there will not be a second camera view available for said swipe direction.

At step 1310, the system selects the second camera view of the available camera views using the ordered list represented by the associated indicator. For example, for an upwards direction swipe resulting in moving down the ordered list, the second camera view may be selected as the next camera view down on the ordered list. It will be understood, however, that varying methods of selection may occur in accordance with additionally included features and available user inputs. For example, for an indicator including a bar that includes a first portion and a second portion, as described previously (e.g., the embodiment in FIG. 7), if the first portion is selected via the touch screen and dragged across multiple camera views in the ordered list represented by the indicator, the second camera selected may be the camera view associated with the location of the first portion in which the user releases the touch screen input. Processing may then continue to step 1312.

At step 1312, the system, upon selecting a second camera view of the available camera views, displays said camera view in place of the first camera view. It will be understood that, while the second camera view may retain a similar shape, size, and location of the first camera view, it may also change all or some combination of features of the first camera view. For example, in a previously described depiction (e.g., the embodiment in FIG. 11), when an upwards swipe is detected on a top camera view, the resulting second camera view is a side camera view that includes a simultaneous display of a left camera view and a right camera view, on the left and right sides of a different display of a camera view in a primary portion of the user interface.

Figure 14:
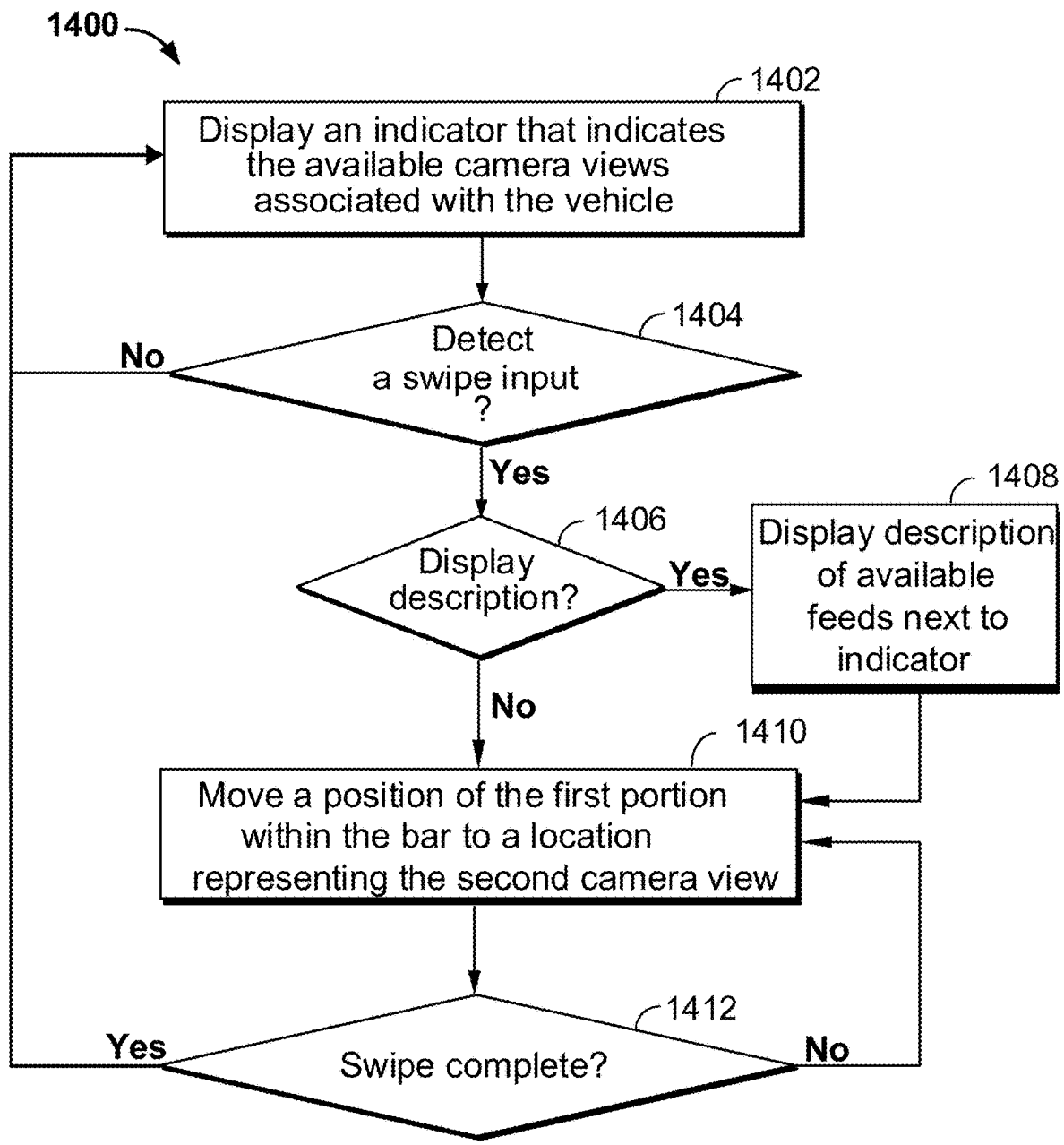
FIG. 14 shows a flowchart for a process for displaying an indicator that indicates the available camera views associated with the vehicle in response to detecting a swipe input, in accordance with some embodiments of the present disclosure.

FIG. 14 shows a flowchart 1400 for a process for displaying an indicator that indicates the available camera views associated with the vehicle in response to detecting a swipe input, in accordance with some embodiments of the present disclosure. Although FIG. 14 is described in the context of the particular structures, components, and processing of the present disclosure, and although a particular order and flow of steps are depicted in FIG. 14, it will be understood that in some embodiments, one or more of the steps may be modified, moved, removed, or added, and that the order of steps depicted in FIG. 14 may be modified.

Exemplary steps for said indicator in response to detecting a swipe input begins at step 1402, where the indicator that indicates the available camera views associated with the vehicle is displayed. For example, the indicator, which includes a bar that includes a first portion and a second portion in accordance with previous depictions (e.g., the bar 512 that includes the first portion 513 and the second portion 514 as described in FIG. 5) may be displayed on the display of a first camera view, although different shapes, sizes, and locations may be utilized. In a previous example, for instance, said indicator included a bar that may be instead represented as a car icon, with available camera views marked on the corresponding locations on the car icon, and the direction of the displayed camera view may be highlighted (e.g., corresponding to the first portion), while directions of other available camera views not being displayed are highlighted in a different color (e.g., corresponding to the second portion). Processing may then continue to step 1404.

At step 1404, the system detects a user input and further determines if said input is an appropriate swipe input. For example, in the depiction herein where the display of the first camera view is in a primary portion of the touch screen user interface, a detected user input may be appropriately considered a swipe input if said input occurs on the display of the first camera view. In response to detecting a determined swipe input ("Yes" at 1404), the rule verification proceeds to step 1306. In response to detecting no swipe input ("No" at 1404), the process loops to step 1402, where the first camera view of available camera views associated with a vehicle continues to be displayed.

At step 1406, the system, via the processing circuitry, determines whether a description of the indicator is to be displayed, wherein said description corresponds to that of previously described depictions (e.g., description 725 in FIG. 7). For example, the system may be configured to display the description whenever an input is detected on the user interface; therefore, the successful detection of a swipe input ("Yes" in 1404) necessarily results in the determination by the system to display the description. In response to determining to display the description ("Yes" to 1406), the rule verification proceeds to step 1408. In response to not determining to display the description, processing continues to step 1410.

At step 1408, the system displays the description of available camera views next to the indicator. For example, in a previous depiction of description 715 in FIG. 7, the available camera views may be delineated by description 715 via text nearby bar 712, although variations in font, size, text color, and language may be utilized. The displayed text of description 715 describes the ordered list of available camera views represented by the indicator (e.g., first indicator 711 in FIG. 7), wherein the displayed text is furthermore located in a position in accordance with the bar of the indicator, such that both the bar and said description correctly correspond to the delineated order represented by the indicator. For example, in another previous depiction of FIG. 5 where the bar 512 is instead a car icon, the displayed text included in the description of each available camera view may be located nearby the highlighted respective direction of said camera view. The description may be configured, by default or by user selection, to be replaced by a different output (e.g., an audio output) or located in a different position, either on the user interface or even on an external device (e.g., a smartphone application that may be connected to the user interface via a logon system). Once the description of available feeds is displayed, processing may continue to step 1410.

At step 1410, the system, in response to the detected swipe input in 1404, directs the movement of a position of the first portion within the bar to a location representing a second camera view. Said second camera view is determined via the output camera view of the process detailed in FIG. 13 (i.e., when a swipe input is detected at step 1404, a swipe input is also necessarily detected in step 1304, and therefore both processes occur within the system). For example, if the process depicted in flowchart 1300 looped to a result where the first camera view of the associated camera views of the vehicle continued to be displayed, then the outputted second camera view would be equivalent to the first camera view, and the location on the bar representing the second camera view would not need to be changed. Once the position of the first portion has moved, processing may continue to step 1412.

At step 1412, the system determines whether the swipe input has been completed by the user. For example, the user may decide to quickly swipe and let go of the touch screen, and once the system has completed 1410, there is no longer a user input being detected and the swipe is complete. In another instance, such as the depiction where the system is configured to accept a user selecting the first portion of the bar via the touch screen and dragging it across multiple different camera views of the available camera views, a swipe input may be detected, the description is displayed, and the position of the first portion of the bar has been moved; however, the user has not let go of the touch screen, and the swipe is not therefore completed. In response to determining that the swipe is complete ("Yes" at 1412), the system loops back to step 1402 with the updated indicator being displayed. In response to determining that the swipe is not complete ("No" at 1412), the system loops back to step 1410 and continues to update the first portion of the bar to a location representing the second camera view, which may or may not continue to be updated, until the swipe completes.

The foregoing is merely illustrative of the principles of this disclosure, and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following paragraphs.

While some portions of this disclosure may refer to examples, any such reference is merely to provide context to the instant disclosure and does not form any admission as to what constitutes the state of the art.

What is claimed is:

1. A method comprising:
    displaying a top view of a vehicle;

displaying, side-by-side with the top view, a first camera view of available camera views associated with the vehicle; and in response to detecting a swipe input associated with the top view of the vehicle, replacing the top view of the vehicle with:
  a left side view from the vehicle positioned to the left of the displayed first camera view; and
  a right side view from the vehicle positioned to the right of the displayed first camera view or second camera view.

2. The method of claim 1, wherein:
displaying the top view and the first camera view comprises displaying the top view and the first camera view on a touch screen; and
detecting the swipe input comprises detecting the swipe input on the touch screen over the top view being displayed.

3. The method of claim 1, further comprising, in response to detecting a swipe input associated with the first camera view:
  selecting a second camera view of the available camera views; and
  displaying the second camera view in place of the first camera view,
  wherein selecting the second camera view of the available camera views is based on a direction of the swipe input.

4. The method of claim 1, further comprising:
displaying an indicator that indicates the available camera views associated with the vehicle.

5. The method of claim 4, further comprising, in response to detecting a swipe input associated with the first camera view:
  selecting a second camera view of the available camera views; and
  displaying the second camera view in place of the first camera view,
  wherein the indicator represents an ordered list of the available camera views and wherein a direction of the swipe input determines the direction within the ordered list that will be used to select the second camera view.

6. The method of claim 4, wherein the indicator comprises:
a bar comprising:
  a first portion representing the first camera view while the first camera view is being displayed; and
  a second portion representing the available camera views not being displayed while the first camera view is being displayed.

7. The method of claim 6, further comprising, in response to detecting a swipe input associated with the first camera view:
  selecting a second camera view of the available camera views;
  displaying the second camera view in place of the first camera view, and
  moving a position of the first portion within the bar to a location representing the second camera view being displayed after detection of the swipe input associated with the first camera view.

8. The method of claim 6, wherein a ratio of a length of the first portion to a length of the bar corresponds to a ratio of the number one to the number of available camera views.

9. The method of claim 4, further comprising, in response to detecting a swipe input associated with the first camera view:
  selecting a second camera view of the available camera views;
  displaying the second camera view in place of the first camera view, and
  displaying a description of the available camera views next to the indicator.

10. The method of claim 4, further comprising:
in response to detecting a selection of the indicator, replacing the first camera view with a mosaic view of the available camera views.

11. The method of claim 1, wherein the available camera views comprise front and back views associated with the vehicle and wherein detecting the swipe input associated with the top view comprises detecting a vertical swipe input.

12. The method of claim 1, wherein:
when the displayed first camera view is a front view, the left side view is a left front side view and the right side view is a right front side view; and
when the displayed first camera view is a rear view, the left side view is a left rear side view and the right side view is a right rear side view.

13. A system comprising:
a memory storing instructions; and
control circuitry configured to execute the instructions stored in the memory to:
  display a top view of a vehicle;
  display, side-by-side with the top view, a first camera view of available camera views associated with the vehicle; and
  in response to detecting a swipe input associated with the top view of the vehicle, replacing the top view of the vehicle with:
    a left side view from the vehicle positioned to the left of the displayed first camera view; and
    a right side view from the vehicle positioned to the right of the displayed first camera view or second camera view.

14. The system of claim 13, further comprising:
a touch screen configured to display the available camera views,
wherein the control circuitry is configured to detect the swipe input on the touch screen over the top view being displayed.

15. The system of claim 13, wherein the control circuitry is configured to:
in response to detecting a swipe input associated with the first camera view:
  select a second camera view of the available camera views;
  display the second camera view in place of the first camera view; and
  display an indicator that represents an ordered list of the available camera views, wherein a direction of the swipe input associated with the first camera view determines the direction within the ordered list that will be used to select the second camera view.

16. The system of claim 15, wherein the control circuitry is configured to:
in response to detecting a selection of the indicator, replace the first camera view with a mosaic view of the available camera views.

17. The system of claim 13, wherein the control circuitry is configured to:
display a vertical bar indicator that indicates the available camera views associated with the vehicle, wherein the available camera views comprise front and back views associated with the vehicle and wherein detecting the swipe input associated with the top view comprises detecting a vertical swipe input.

18. A vehicle comprising:
one or more front facing cameras;
one or more rear facing cameras;
a display; and
control circuitry configured to:
  display a top view of the vehicle;
  display, side by side with the top view of the vehicle, a first video feed of the one or more front facing cameras or the one or more rear facing cameras on the display; and
  in response to detecting a swipe input associated with the top view of the vehicle on the display, replace the top view of the vehicle with:
    a left side view from the vehicle positioned to the left of the displayed first camera view; and
    a right side view from the vehicle positioned to the right of the displayed first camera view or second camera view.

\* \* \* \* \*